United States Patent [19]

Kale et al.

[11] Patent Number: 5,582,923

[45] Date of Patent: Dec. 10, 1996

[54] EXTRUSION COMPOSITIONS HAVING HIGH DRAWDOWN AND SUBSTANTIALLY REDUCED NECK-IN

[75] Inventors: Lawrence T. Kale; Pradeep Jain, both of Lake Jackson; David C. Kelley, Angleton; Deepak R. Parikh, Lake Jackson; Sharon L. Baker, Lake Jackson; Osborne K. McKinney, Lake Jackson, all of Tex.

[73] Assignee: The Dow Chemical Company, Midland, Mich.

[21] Appl. No.: 344,262

[22] Filed: Nov. 23, 1994

Related U.S. Application Data

[63] Continuation-in-part of Ser. No. 327,156, Oct. 21, 1994, abandoned, and Ser. No. 84,054, Jun. 29, 1993, Pat. No. 5,395,471, which is a continuation-in-part of Ser. No. 776,130, Oct. 15, 1991, Pat. No. 5,278,236, said Ser. No. 939,281, Sep. 2, 1992, Pat. No. 5,278,272, and Ser. No. 55,063, Apr. 28, 1993.

[51] Int. Cl.$^6$ ............................. C08L 23/04; C08J 5/00; B32B 27/32

[52] U.S. Cl. .......................... 428/523; 428/522; 428/516; 525/240; 525/227; 525/221; 525/222; 525/190; 264/171.23; 264/176.1

[58] Field of Search .................................. 525/240, 227, 525/221, 222, 190; 428/516, 523; 264/176.1

[56] References Cited

U.S. PATENT DOCUMENTS

| | | |
|---|---|---|
| Re. 33,683 | 9/1991 | Allen et al. . |
| 3,247,290 | 4/1966 | Werkman et al. ...................... 260/897 |
| 3,371,464 | 3/1968 | Swick . |
| 3,456,044 | 7/1969 | Pahlke . |
| 3,491,073 | 1/1970 | Marinak . |
| 3,555,604 | 1/1971 | Pahlke . |
| 3,645,992 | 2/1972 | Elston ................................... 260/80.78 |
| 3,914,342 | 10/1975 | Mitchell ............................... 260/897 A |
| 4,011,384 | 3/1977 | Baxmann et al. . |
| 4,076,698 | 2/1978 | Anderson et al. .................... 526/348.6 |
| 4,205,021 | 5/1980 | Morita et al. . |
| 4,243,619 | 1/1981 | Fraser et al. . |
| 4,259,468 | 3/1981 | Kajiura et al. . |
| 4,302,566 | 11/1981 | Karol et al. . |
| 4,303,710 | 12/1981 | Bullard et al. . |
| 4,303,771 | 12/1981 | Wagner et al. . |
| 4,328,328 | 5/1982 | Minami et al. . |
| 4,339,493 | 7/1982 | Weiner . |
| 4,339,496 | 7/1982 | Weiner . |
| 4,339,507 | 7/1982 | Kurtz et al. . |
| 4,340,640 | 7/1982 | Weiner . |
| 4,340,641 | 7/1982 | Weiner . |
| 4,346,834 | 8/1982 | Mazumdar . |
| 4,348,346 | 9/1982 | Thompson ............................. 264/146 |
| 4,349,648 | 9/1982 | Jorgensen et al. . |
| 4,352,849 | 10/1982 | Mueller . |
| 4,354,009 | 10/1982 | Goeke et al. . |
| 4,359,495 | 11/1982 | Schroeder et al. ........................ 428/35 |

(List continued on next page.)

FOREIGN PATENT DOCUMENTS

| | | |
|---|---|---|
| 141597A1 | 5/1985 | European Pat. Off. . |
| 0243965A2 | 4/1987 | European Pat. Off. . |
| 0333508A2 | 9/1989 | European Pat. Off. . |
| 0404368A2 | 12/1990 | European Pat. Off. . |
| 0404969A1 | 1/1991 | European Pat. Off. . |
| 416815A2 | 3/1991 | European Pat. Off. . |
| 452920A2 | 10/1991 | European Pat. Off. . |
| 0217252B1 | 11/1991 | European Pat. Off. . |
| 495099A1 | 7/1992 | European Pat. Off. . |
| 0597502A2 | 5/1994 | European Pat. Off. . |
| 0600425A1 | 6/1994 | European Pat. Off. . |
| 58-176546 | 9/1983 | Japan . |
| 61-28538 | 2/1986 | Japan . |
| 62-10150 | 1/1987 | Japan . |
| 1108288 | 4/1989 | Japan . |
| 2123747A | 2/1984 | United Kingdom . |
| 2206890A | 1/1989 | United Kingdom . |
| 90/03414 | 4/1990 | WIPO . |
| 9106426 | 5/1991 | WIPO . |
| 92/14784 | 9/1992 | WIPO . |
| 93/03093 | 2/1993 | WIPO . |
| 9307210 | 4/1993 | WIPO . |
| 9308221 | 4/1993 | WIPO . |
| 94/06857 | 3/1994 | WIPO . |
| 94/07930 | 4/1994 | WIPO . |
| 94/07954 | 4/1994 | WIPO . |
| 94/28064 | 8/1994 | WIPO . |
| 94/18263 | 8/1994 | WIPO . |
| 94/12568A1 | 9/1994 | WIPO ............................. C08L 23/08 |

OTHER PUBLICATIONS

Roberts et al., *ANTEC Proceedings '85*, "New Process for the Reduction of Draw Resonance in Melt Embossing and Extrusion Coating", pp. 104–107.

Lucchesi et al., *Plastic Engineering*, "Reducing Draw Resonance in LLDPE film resins", pp. 87–90, May 1985.

*ANTEC Proceedings '89*, "Resistance to Draw Resonance of Linear Low Density Polyethylene Through Improved Resin Design", pp. 28–30.

Randall, *ACS Symposium Series No. 142*, "Polymer Characterization by ESR and NMR", pp. 93–117 (1980).

M. Shida et al., *Polymer Engineering Science*, vol. 17, No. 11, "Correlation of Low Density Polyethylene Rheological Measurements with Optical and Processing Properties", pp. 769–774 (1977).

(List continued on next page.)

*Primary Examiner*—Carman J. Seccuro, Jr.

[57] ABSTRACT

An ethylene polymer extrusion composition having high draw down and substantially reduced neck-in, a process for making such a composition and a process of using such a composition to prepare extrusion coatings, extrusion profiles and extrusion cast films are disclosed. The ethylene polymer extrusion composition is made of 75–95 weight percent of at least one ethylene α-olefin interpolymer and 5–25 weight percent of at least one high pressure ethylene polymer characterized as having high melt strength and a broad, bimodal molecular weight distribution. In profiles, coatings or films, the composition can be used as sealant, adhesive or abuse resistance layers.

51 Claims, 3 Drawing Sheets

U.S. PATENT DOCUMENTS

| | | | |
|---|---|---|---|
| 4,359,553 | 11/1982 | Edwards | 525/240 |
| 4,359,561 | 11/1982 | Fraser et al. | |
| 4,363,904 | 12/1982 | Fraser et al. | |
| 4,365,044 | 12/1982 | Liu | 525/240 |
| 4,367,256 | 1/1983 | Biel | |
| 4,370,456 | 1/1983 | George | |
| 4,378,451 | 3/1983 | Edwards | 525/240 |
| 4,379,197 | 4/1983 | Cipriani et al. | |
| 4,380,567 | 4/1983 | Shigemoto | |
| 4,383,095 | 5/1983 | Goeke et al. | |
| 4,387,185 | 6/1983 | Schroeder et al. | 525/194 |
| 4,390,677 | 6/1983 | Karol et al. | |
| 4,399,180 | 8/1983 | Briggs | |
| 4,405,774 | 9/1983 | Miwa et al. | |
| 4,410,649 | 10/1983 | Cieloszyk | |
| 4,418,114 | 11/1983 | Briggs et al. | |
| 4,424,138 | 1/1984 | Candlin et al. | |
| 4,427,573 | 1/1984 | Miles et al. | |
| 4,427,833 | 1/1984 | Edwards | 525/240 |
| 4,429,079 | 1/1984 | Shibata et al. | |
| 4,438,238 | 3/1984 | Fukushima et al. | 525/240 |
| 4,438,243 | 3/1984 | Kashiwa et al. | |
| 4,452,958 | 6/1984 | Chester et al. | |
| 4,454,281 | 6/1984 | Heitz et al. | |
| 4,461,792 | 7/1984 | Anthony | |
| 4,463,153 | 7/1984 | Mizutani et al. | |
| 4,464,426 | 8/1984 | Anthony | |
| 4,467,065 | 8/1984 | Williams et al. | |
| 4,474,740 | 10/1984 | Gross et al. | |
| 4,482,687 | 11/1984 | Noshay et al. | |
| 4,485,217 | 11/1984 | Gunter et al. | |
| 4,486,377 | 12/1984 | Luchesi et al. | 264/510 |
| 4,486,552 | 12/1984 | Neimann | 523/169 |
| 4,486,579 | 12/1984 | Machon et al. | |
| 4,505,970 | 3/1985 | Craver | |
| 4,510,303 | 4/1985 | Oda et al. | |
| 4,513,038 | 4/1985 | Anthony | |
| 4,514,465 | 4/1985 | Schoenberg | |
| 4,519,968 | 5/1985 | Klaus et al. | |
| 4,526,919 | 7/1985 | Edwards | 524/232 |
| 4,528,312 | 7/1985 | Edwards | 524/232 |
| 4,530,914 | 7/1985 | Ewen et al. | |
| 4,532,189 | 7/1985 | Mueller | |
| 4,542,886 | 9/1985 | Yoshimura et al. | 264/22 |
| 4,544,762 | 10/1985 | Kaminsky et al. | 556/179 |
| 4,547,555 | 10/1985 | Cook et al. | |
| 4,551,380 | 11/1985 | Schoenberg | |
| 4,563,504 | 1/1986 | Hert et al. | |
| 4,564,559 | 1/1986 | Wagner | |
| 4,568,713 | 2/1986 | Hansen et al. | |
| 4,587,303 | 5/1986 | Turtle | |
| 4,587,318 | 5/1986 | Inoue et al. | |
| 4,588,650 | 5/1986 | Mientus et al. | |
| 4,588,794 | 5/1986 | Oda | |
| 4,593,009 | 6/1986 | Nowlin | |
| 4,597,920 | 7/1986 | Golike | |
| 4,598,128 | 7/1986 | James et al. | |
| 4,599,391 | 7/1986 | Yamamoto et al. | |
| 4,599,392 | 7/1986 | McKinney et al. | |
| 4,608,221 | 8/1986 | Kurtz et al. | 264/556 |
| 4,613,547 | 9/1986 | Wagner et al. | |
| 4,617,241 | 10/1986 | Mueller | |
| 4,618,662 | 10/1986 | Nowlin | |
| 4,623,581 | 11/1986 | Hert | |
| 4,624,991 | 11/1986 | Haas | |
| 4,626,467 | 12/1986 | Hostetter | |
| 4,626,574 | 12/1986 | Cancio et al. | 525/240 |
| 4,629,771 | 12/1986 | Candlin et al. | |
| 4,640,856 | 2/1987 | Ferguson | |
| 4,649,001 | 3/1987 | Nakamura et al. | |
| 4,666,772 | 5/1987 | Schinkel et al. | |
| 4,666,999 | 5/1987 | Cook et al. | |
| 4,668,463 | 5/1987 | Cancio et al. | 264/556 |
| 4,668,575 | 5/1987 | Schinkel et al. | |
| 4,668,650 | 5/1987 | Lo et al. | |
| 4,668,752 | 5/1987 | Tominari et al. | |
| 4,672,096 | 6/1987 | Nowlin | |
| 4,676,922 | 6/1987 | Sommer | |
| 4,677,087 | 6/1987 | Lo et al. | |
| 4,690,991 | 9/1987 | Seppl | |
| 4,690,992 | 9/1987 | Grubbs et al. | |
| 4,692,386 | 9/1987 | Schinkel et al. | |
| 4,710,538 | 12/1987 | Jorgensen | |
| 4,716,207 | 12/1987 | Cozewith et al. | |
| 4,719,193 | 1/1988 | Levine et al. | |
| 4,720,427 | 1/1988 | Clauson et al. | |
| 4,722,971 | 2/1988 | Datta et al. | |
| 4,724,185 | 2/1988 | Shah | |
| 4,732,882 | 3/1988 | Allen et al. | |
| 4,737,391 | 4/1988 | Lustig et al. | |
| 4,742,138 | 5/1988 | Kageyama | |
| 4,755,403 | 7/1988 | Ferguson | |
| 4,755,419 | 7/1988 | Shah | |
| 4,762,898 | 8/1988 | Matsuura et al. | |
| 4,764,549 | 8/1988 | Greenhalgh et al. | |
| 4,767,485 | 8/1988 | Michiels | 156/244.11 |
| 4,775,710 | 10/1988 | Dunski et al. | |
| 4,780,264 | 10/1988 | Dohrer et al. | 264/556 |
| 4,788,232 | 11/1988 | Needham | |
| 4,789,714 | 12/1988 | Cozewith et al. | |
| 4,792,595 | 12/1988 | Cozewith et al. | |
| 4,798,081 | 1/1989 | Hazlitt et al. | 73/53 |
| 4,801,486 | 1/1989 | Quacquarella et al. | |
| 4,803,253 | 2/1989 | McDaniel et al. | |
| 4,808,635 | 2/1989 | Nguyen | |
| 4,820,557 | 4/1989 | Warren | |
| 4,820,589 | 4/1989 | Dobreski et al. | |
| 4,824,889 | 4/1989 | Mostert | |
| 4,826,939 | 5/1989 | Stuart | |
| 4,830,926 | 5/1989 | Mostert | |
| 4,833,017 | 5/1989 | Benoit | |
| 4,834,947 | 5/1989 | Cook et al. | |
| 4,842,187 | 6/1989 | Janocha et al. | |
| 4,842,930 | 6/1989 | Schinkel | |
| 4,842,951 | 6/1989 | Yamada et al. | |
| 4,857,611 | 8/1989 | Durand et al. | |
| 4,859,379 | 8/1989 | Chiang | 264/25 |
| 4,863,769 | 9/1989 | Lustig et al. | |
| 4,863,784 | 9/1989 | Lustig et al. | |
| 4,865,902 | 9/1989 | Golike et al. | |
| 4,874,820 | 10/1989 | Cozewith et al. | |
| 4,876,321 | 10/1989 | Lo et al. | |
| 4,882,406 | 11/1989 | Cozewith et al. | |
| 4,883,853 | 11/1989 | Hobes et al. | |
| 4,886,690 | 12/1989 | Davis et al. | |
| 4,888,318 | 12/1989 | Allen et al. | |
| 4,892,911 | 1/1991 | Genske | |
| 4,921,920 | 5/1990 | Collomb-Ceccarini et al. | |
| 4,923,750 | 5/1990 | Jones | |
| 4,925,728 | 5/1990 | Crass et al. | |
| 4,927,708 | 5/1990 | Herran et al. | |
| 4,935,474 | 6/1990 | Ewen et al. | |
| 4,937,299 | 6/1990 | Ewen et al. | |
| 4,952,451 | 8/1990 | Mueller | |
| 4,957,790 | 9/1990 | Warren | |
| 4,959,436 | 9/1990 | Cozewith et al. | |
| 4,963,388 | 10/1990 | Benoit | |
| 4,963,419 | 10/1990 | Lustig et al. | |
| 4,963,427 | 10/1990 | Botto et al. | |
| 4,966,951 | 10/1990 | Benham et al. | |
| 4,967,898 | 12/1990 | Lustig et al. | |
| 4,968,765 | 11/1990 | Yagi et al. | |

| | | |
|---|---|---|
| 4,975,315 | 12/1990 | Bolthe et al. . |
| 4,976,898 | 11/1990 | Lustig et al. . |
| 4,977,022 | 12/1990 | Mueller . |
| 4,981,760 | 1/1991 | Naito et al. . |
| 4,981,826 | 1/1991 | Speca . |
| 4,983,447 | 1/1991 | Crass et al. . |
| 4,987,212 | 1/1991 | Morterol et al. . |
| 4,988,465 | 1/1991 | Lustig et al. . |
| 4,996,094 | 2/1991 | Dutt . |
| 5,006,396 | 4/1991 | VanBortel et al. . |
| 5,006,398 | 4/1991 | Banerji . |
| 5,013,801 | 5/1991 | Cozewith et al. . |
| 5,015,511 | 5/1991 | Treybig et al. . |
| 5,015,749 | 5/1991 | Schmidt et al. ......... 556/179 |
| 5,019,315 | 5/1991 | Wilson . |
| 5,024,799 | 6/1991 | Harp et al. . |
| 5,025,072 | 6/1991 | Nowlin et al. . |
| 5,026,798 | 6/1991 | Canich ......... 526/127 |
| 5,032,463 | 7/1991 | Smith . |
| 5,041,316 | 8/1991 | Parnell et al. . |
| 5,041,584 | 8/1991 | Crapo et al. ......... 556/179 |
| 5,041,585 | 8/1991 | Deavenport et al. ......... 556/179 |
| 5,043,040 | 8/1991 | Butler . |
| 5,047,468 | 9/1991 | Lee et al. . |
| 5,055,328 | 10/1991 | Evert et al. . |
| 5,055,338 | 10/1991 | Sheth et al. . |
| 5,055,438 | 10/1991 | Canich ......... 502/117 |
| 5,055,533 | 10/1991 | Allen et al. . |
| 5,055,534 | 10/1991 | Theobald . |
| 5,059,481 | 10/1991 | Lustig et al. . |
| 5,064,796 | 11/1991 | Speca . |
| 5,064,802 | 11/1991 | Stevens et al. ......... 502/155 |
| 5,068,489 | 11/1991 | Edwards et al. . |
| 5,073,452 | 12/1991 | Satou et al. . |
| 5,073,599 | 12/1991 | Genske . |
| 5,075,143 | 12/1991 | Bekele . |
| 5,082,908 | 1/1992 | Imai et al. . |
| 5,084,039 | 1/1992 | Cancio et al. . |
| 5,084,540 | 1/1992 | Albizzati et al. . |
| 5,084,927 | 2/1992 | Parkevich . |
| 5,089,321 | 2/1992 | Chum et al. . |
| 5,106,545 | 4/1992 | Warren . |
| 5,106,688 | 4/1992 | Bradfute et al. . |
| 5,112,674 | 5/1992 | German et al. . |
| 5,132,074 | 7/1992 | Isozaki et al. . |
| 5,206,075 | 4/1993 | Hodgson, Jr. ......... 428/516 |
| 5,218,071 | 6/1993 | Tsutsui et al. ......... 526/348 |
| 5,241,031 | 8/1993 | Mehta ......... 526/348.1 |
| 5,272,236 | 12/1993 | Lai et al. . |
| 5,278,272 | 1/1994 | Lai et al. . |
| 5,376,439 | 12/1994 | Hadgson et al. . |
| 5,380,810 | 1/1995 | Lai et al. ......... 526/352 |
| 5,395,471 | 3/1995 | Obijeski et al. ......... 156/244.11 |
| 5,444,145 | 8/1995 | Brant et al. ......... 526/348.3 |

OTHER PUBLICATIONS

John Dealy, *Rheometers for Molten Plastics*, Van Nostrand Reinhold Co., pp. 97–99, (1982).

S. Lai et al., *ANTEC '93 Proceedings*, "Dow Constrained Geometry Catalyst Technology (CGCT)–New Rules for Ethylene α–Olefin Interpolymers–Controlled Rhelogy Polyolefins", New Orleans, LA, pp. 1182–1192, (May 1993).

Ramamurthy, *Journal of Rhelogy*, "Wall Slip in Viscous Fluids and Influence of Materials of Construction", John Wiley and Sons, 30(2), pp. 337–357, (1986).

Wild et al., *Journal of Polymer Science, Poly. Phys. Ed.*, "Determination of Branching Distributions in Polyethylene and Ethylene Copolymers*", John Wiley & Sons, vol. 20, pp. 441, (1982).

Williams and Ward, *Journal of Polymer Science: Polymer Letters*, vol. 6, "The Construction of a Calibration Curve for Gel Permeation Chromatography using Polystyrene Fractions", pp. 621–627, (1968).

Derwent 90–239017/31.

*Journal of Polymer Science*, Part A, vol. 1 (pp. 2869–2880(1963)). "Long–Chain Branching Frequency in Polyethylene" by J. E. Guillet.

*Polymer Preprints, Amer. Chem. Society*, vol. 12, No. 1, pp. 277–281 (Mar. 1971), "Evidence of Long–Chain Branching in High Density Polyethylene" E. E. Drott and R. A. Mendelson.

*Journal of the American Chemical Society*, 98:7, pp. 1729–1742 (Mar. 31, 1976) "Structure and Chemistry of Bis(cyclopentadienyl)–MLn Complexes" by Joseph W. Lauher and Roald Hoffman.

*Polymer Engineering and Science*, vol. 16, No. 12, pp. 811–816 (Dec. 1976). "Influence of Long–Chain Branching on the Viscoelastic Properties of Low–Density Polyethylenes" by L. Wild, R. Ranganath, and D. Knobeloch.

*Angew. Chem. Int. Ed. Engl.*, pp. 630–632 (1976) vol. 15, No. 10, "Halogen–Free Soluble Ziegler Catalysts for the Polymerization of Ethylene. Control of Molecular Weight by Choice of Temperature" by Arne Andresen et al.

*Advances in Organometallic Chemistry*, pp. 99–148, vol. 18, (1980) "Ziegler–Natta Catalysis" by Hansjorg Sinn and Walter Kaminsky.

*Angew. Chem. Int. Ed. Engl.*, pp. 390–393, vol. 19 No. 5 (1980) "Living Polymers on Polymerization with Extremely Productive Ziegler Catalysts" by Hansjorg Sinn, Walter Kaminsky, Hans Jurgen Vollmer, and Rudiger Woldt.

*Polymer Bullentin*, 9, pp. 464–469 (1983) "Halogen Free Soluble Ziegler Catalysts with Methylalumoxan as Catalyst" by Jens Herwig and Walter Kaminsky.

*Makromol. Chem., Rapid Commun.*, 4, pp. 417–421 (1983) "Bis(cyclopentadienyl)zirkon–Verbingungen und Aluminoxan als Ziegler–Katalysatoren fur die Polymerisation und Copolymerisation von Olefinen" by Walter Kaminsky et al.

*ANTEC Proceedings*, pp. 306–309 (1983), "Analysis of Long Chain Branching in High Density Polyethylene" by J. K. Hughes.

*Makromol. Chem., Rapid Commun.*, (5) pp. 225–228 (1984) "Influence of Hydrogen on the polymerization of ethylene with the homogeneous Ziegler system bis(cyclopentadienyl)zirconiumdicholoride/aluminoxane" by Walter Kaminsky et al.

*Journal of Polymer Science: Polymer Chemistry Edition*, pp. 2117–2133(1985) vol. 23, "Homogeneous Ziegler–Natta Catalysis .II. Ethylene Polymerization by IVB Transition Metal Complexes/Methyl Aluminoxane Catalyst Systems" by E. Giannetti and R. Mazzocchi.

*Journal of Applied Polymer Science*, pp. 3751–3765(1985) vol. 30, "On the Effects of Very Low Levels of Long Chain Branching on Rheological Behavior in Polyethylene" by B. H. Bersted.

*Journal of Polymer Science: Polymer Chemistry Edition*, pp. 2151–2164(1985) vol. 23, "Ethylene Propylene Diene Terpolymers Produced with a Homogeneous and Highly Active Zirconium Catalyst" by Walter Kaminsky et al.

*The Society of Rheology*, pp. 337–357 (1986) vol. 30, "Wall Slip in Viscous Fluids and Influence of Materials of Construction" by A. V. Ramamurthy.

*Makromol. Chem., Macromol. Symp.*, 4, pp. 103–118(1986) "Elastomers By Atactic Linkage of α–Olefins Using Soluble Ziegler Catalysts" by W. Kaminsky and M. Schlobohm.

*Journal of Rheology*, 31(8) pp. 815–834 (1987) "Wall Slip and Extrudate Distortion in Linear Low–Density Polyethylene" by D. Kalika and M. Denn.

*Makromol. Chem.*, 190, pp. 515–526(1989) "Copolymerization of Cycloalkenes with Ethylene In Presence of Chiral Zirconocene Catalysts" by W. Kaminsky and R. Spiehl.

*Journal of Macromolecular Science: Reviews in Macromolecular Chemistry and Physics*, C29(2&3), pp. 201–303 (1989) "A Review of High Resolution Liquid $^{13}$Carbon Nuclear Magnetic Resonance Characterizations of Ethylene–Based Polymers".

*Journal of Non–Newtonian Fluid Mechanics*, 36, pp. 255–263 (1990) "Additional Observations on The Surface Melt Fracture Behavior Of Linear Low–Density Polyethylene" by R. Moynihan, D. Baird, and R. Ramanathan.

*Makromol. Chem. Rapid Commun.*, pp. 89–94 (1990) "Terpolymers of Ethylene, Propene and 1,5–Hexadiene Synthesized with Zirconocene/Methylaluminoxane" by W. Kaminsky and H. Drogemuller.

*Journal of Rheology*, 35(4), 3(May, 1991) pp. 497–52. "Wall Slip of Molten High Density Polyethylene. I. Sliding Plate Rheometer Studies" by S. G. Hatzikiriakos and J. M. Dealy.

*Proceedings of the 1991 IEEE Power Engineering Society*, pp. 184–190 (Sep. 22–27, 1991), "New Specialty Linear Polymers (SLP) For Power Cables" by Monica Hendewerk and Lawrence Spenadel.

*Society of Plastic Engineers Proceedings*, Polyolefins VII International Conference, Feb. 24–27, 1991. "Structure/Property Relationships In Exxpol™ Polymers" (pp. 45–66) by C. Speed, B. Trudell, A. Mehta, and F. Stehling.

1991 *Specialty Polyolefins Conference Proceedings*, "The Marketing Challenge Created By Single Site Catalysts in Polyolefins," Sep. 24, 1991. (pp. 41–45) by Michael P. Jeffries.

*High Polymers*, vol. XX, "Crystalline Olefin Polymers" Part 1, pp. 495–501.

1991 *Polymers, Laminations & Coatings Conference*, TAPPI Proceedings, presented in Feb., 1991, pp. 289–296, "A New Family of Linear Ethylene Polymers with Enhanced Sealing Performance" by D. Van der Sanden and R. W. Halle.

*Society of Plastic Engineers 1991 Specialty Polyolefins Conference Proceedings*, pp. 41–55, "The Marketing Challenge Created by Single Site Catalysts in Polyolefins" by M. Jefferies (Sep. 24, 19910.

*Advances In Polvolefins*, by R. B. Sevmour and T. Cheng, (1987) pp. 373–380 "Crystallinity and Morphology of Ethylene/α–Olefin Copolymers" by P. Schouterden, G. Groeninckx, and H. Reynaers.

*Advances in Polyolefins*, by R. B. Seymour and T. Cheng (1987) "New Catalysis and Process For Ethylene Polymerization", pp. 337–354, by F. Karol, B. Wagner, L. Levine, G. Goeke, and A. Noshay.

*Advances In Polyolefins*, by R. B. Seymour and T. Cheng, (1987) "Polymerization of Olefins With A Homogeneous Zirconium/Alumoxane Catalyst", pp. 361–371 by W. Kaminsky and H. Hahnsen.

*ANTEC '92 Proceedings*, pp. 154–158 ("Exact™Linear Ethylene Polymers for Enhanced Sealing Performance" by D. Van der Sanden and R. W. Halle).

*Society of Plastics Engineers*, Polyolefins VII International Conference, Feb. 24–27, 1991, "Structure/Property Relationships in Exxpol™Polymers", pp. 45–66, Speed et al.

*ACS Symposium Series No. 142*, "Polymer Characterization by ESR and NMR", by Randall Williams and Word in *Journal of Polymer Science, Polymer Letters, vol. 6 p. 621 (1968)*.

*Polymer Engineering and Science*, vol. 17, No. 11, 1977, "Correlation of Low Density Polyethylene Rheological Measurements with Optical and Processing Properties", Shida et al.

*Rheometers for Molten*, John Dealy, Van Nostrand Reinhold Co. (1982), pp. 97–99.

*The Encyclopedia of Chemical Technology*, Kirtk–Othmer, Third Edition, John Wiley & Sons, New York, 1981, vol. 16, pp. 415–417.

*The Encyclopedia of Chemical Technology*, Kirk–Othmer, Third Edition, John Wiley & Sons New York, 1981, vol. 18, pp. 191–192.

*Journal of Polymer Science, Poly. Phys. Ed.*, "Determination of Branching Distributions in Polyethylene and Ethylene Copolymers", vol. 20, pp. 441–455 (1982) Wild et al.

*Journal of Rhelogy*, "Wall Slip in Viscous Fluids and Influence of Materials of Construction", 30(2), pp. 337–257 (1986), by Ramamurthy.

*Proceedings of the 1991 IEEE Power Engineering Society*, pp. 184–190, Sep. 22–27, 1991, "New Speciality Linear Polymers (SLP) for Power Cables", by Hendewerk et al.

*1992 Polymers, Laminations & Coatings Conference*, pp. 103–111, "A New Family of Linear Ethylene Polymers with Enhanced Sealing Performance designed for Multilayer Barrier Food Packaging Films"by D. Van der Sanden and R. W. Halle.

*1991 Polymers, Laminations & Coatings Conference*, pp. 289–296, "A New Family of Linear Ethylene Polymers Provides Enhanced Sealing Performance" by Van der Sanden et al.

*Feb. 1992 Tappai Journal*, pp. 99–103, "A New Family of Linear Ethylene Polymers Provides Enhanced Sealing Performance" by Van der Sanden et al.

Modern Plastics International, vol. 23, No. 8, Aug. 1993, pp. 40–41, Don Schwank "Single–Site metallocene catalysts yield tailor–made polyolefin resins".

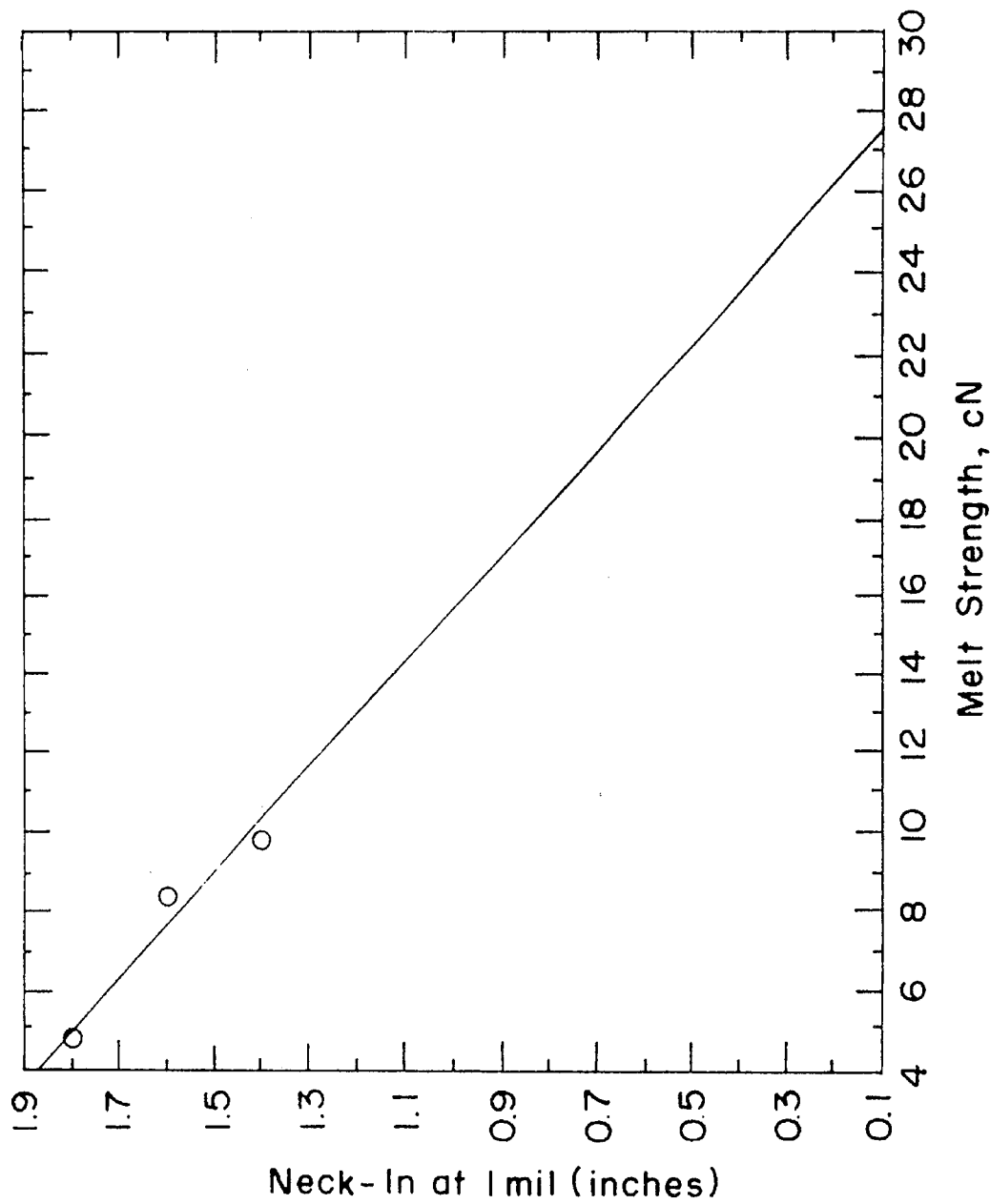

EXTRUSION COMPOSITIONS HAVING HIGH DRAWDOWN AND SUBSTANTIALLY REDUCED NECK-IN

CROSS-REFERENCE TO RELATED APPLICATIONS

This application is a continuation-in-part application of application Ser. No. 08/327,156, filed Oct. 21, 1994, now abandoned, and a continuation-in-part application of application Ser. No. 08/084,054, filed Jun. 29, 1993, now U.S. Pat. No. 5,395,471, which is a continuation-in-part application of patent application 07/776,130, filed Oct. 15, 1991, issued as U.S. Pat. No. 5,278,236; a continuation-in-part of patent application Ser. No. 07/939,281, filed Sep. 2, 1992, issued as U.S. Pat. No. 5,278,272; a continuation-in-part of application Ser. No. 08/055,063 filed Apr. 28, 1993; and is related to application Ser. No. 07/961,269, filed Oct. 14, 1992, now abandoned, the disclosures of all of which are incorporated herein by reference.

BACKGROUND OF THE INVENTION

Field of the Invention

This invention pertains to polyethylene extrusion compositions. In particular, the invention pertains to an ethylene polymer extrusion composition having high drawdown and substantially reduced neck-in. The invention also pertains to a method of making the ethylene polymer extrusion composition and a method for making an extrusion coated article, an article in the form of an extrusion profile and an article in the form of an extrusion cast film.

Technical Background

It is known that low density polyethylene (LDPE) made by high-pressure polymerization of ethylene with free-radical initiators as well as heterogeneous linear low density polyethylene (LLDPE) and ultra low density polyethylene (ULDPE) made by the copolymerization of ethylene and α-olefins with Ziegler coordination (transition metal) catalysts at low to medium pressures can be used, for example, to extrusion coat substrates such as paper board, to prepare extrusion cast film for applications such as disposable diapers and food packaging and to prepare extrusion profiles such as wire and cable jacketing. However, although LDPE generally exhibits excellent extrusion processability and high extrusion drawdown rates, LDPE extrusion compositions lack sufficient abuse resistance and toughness for many applications. For extrusion coating and extrusion casting purposes, efforts to improve abuse properties by providing LDPE compositions having high molecular weights (i.e., having melt index, $I_2$, less than about 2 g/10) are not effective since such compositions inevitably have too much melt strength to be successfully drawn down at high lines speeds.

While LLDPE and ULDPE extrusion compositions offer improved abuse resistance and toughness properties and MDPE (medium density polyethylene) extrusion compositions offer improved barrier resistance (against, for example, moisture and grease permeation), these linear ethylene polymers can not be extruded or drawn down at high take-off rates and they are known to exhibit relatively poor extrusion processability.

The ultimate extrusion drawdown rate of ethylene α-olefin interpolymers is limited (at otherwise practicable extrusion line speeds) by the onset of a melt flow instability phenomena known as draw resonance rather than being limited by melt tension breaks due to "strain hardening" which occurs at higher line speeds and is typical for LDPE and other highly branched high pressure ethylene polymers such as, for example, ethylene-acrylic acid (EAA) copolymers and ethylene vinyl acetate (EVA) copolymers.

"Draw resonance" or "melt surging" occurs in LLDPE, ULDPE and other linear polymers such as high density polyethylene (HDPE), polypropylene and polyester during processing that involves rapid drawing or pulling of the melt such as extrusion coating, extrusion cast film fabrication, profile extrusion and fine denier fiber spinning. Also, the onset or occurrence of draw resonance is unmistakable.

The patent teachings of Kurtz et al. in U.S. Pat. No. 4,339,507 and Lucchesi et al. in U.S. Pat. No. 4,486,377 (the disclosures of both of which are incorporated herein by reference) describe draw resonance as a sustained random and/or periodic oscillation, variation or pulsation of the polymer melt with respect to the velocity and cross-sectional area of a melt drawing process that occurs between the die and the take-off position when the boundary conditions are a fixed velocity at the die and a fixed velocity at the take-off position. Draw resonance occurs when the draw ratio (i.e., the melt velocity at take-off divided by the melt velocity instantaneous at the die exit often approximated by dividing the reciprocal of the final polymer thickness by the reciprocal of the thickness of the melt instantaneous at the die exit) exceeds a polymer specific critical value. Draw resonance is a melt flow instability that is manifested as irregularities in the final coating, film or fiber dimensions and often produce widely variable thicknesses and widths. When line speeds significantly exceed the speed of onset, draw resonance can cause web or filament breaks and thereby shut down the entire drawing or converting process.

Given the various differences and intricacies that can exist between different extrusion equipment, relative resistance to draw resonance is often expressed in terms of critical draw ratio, and for conventional linear ethylene polymers, maximum stable draw ratios have been found to be less than 10:1, although draw ratios greater than 20:1 are needed for most commercial drawing operations.

"Drawdown" is defined herein to mean stretching or elongating a molten polymer extrudate (web or filament) in the machine direction and occasionally (simultaneously to a lesser degree) also in the transverse direction.

"Melt strength" which is also referred to in the relevant art as "melt tension" is defined and quantified herein to mean the stress or force (as applied by a wind-up drum equipped with a strain cell) required to draw a molten extrudate at some specified rate above its melting point as it passes through the die of a standard plastometer such as the one described in ASTM D1238-E. Melt strength values, which are reported herein in centi-Newtons (cN), are determined using a Gottfert Rheotens at 190° C. In general, for ethylene α-olefin interpolymers and high pressure ethylene polymers, melt strength tends to increase with increased molecular weight, or with broadening of the molecular weight distribution and/or with increased melt flow ratios.

"Neck-in" which is influenced by extrudate swelling and, to lesser degree, by surface tension effects is defined herein as the difference between the die width and the extrudate width at the taken-off position or the final width of the fabricated article. Measured neck-in values (at constant output) will remain constant or decrease as the drawdown rate increases, and, in general, it is well known that for conventional ethylene polymers neck-in values increase as molecular weight decreases and/or as the molecular weight distribution narrows. The neck-in values reported herein are determined at a 1 mil monolayer extrusion coating weight using a 3.5-inch diameter, 30:1 L/D Black-Clawson extrusion coater equipped with a 30 inch wide die deckled to 24 inches and having a 20-mil die gap and 50-lb. Kraft paper.

"Take-off position" is defined herein to mean the contact point (either the top or bottom) of a roller device that draws or pulls the molten extrudate down from its initial thickness instantaneous at the die exit to its final thickness. The roller device can be a nip roll, rubber roll, a chill roll, combinations thereof, or the like constructed from, for example, metal or rubber with various surfaces such as polished, matte or embossed finishes; all of which can to varying degrees affect the onset of draw resonance.

A variety of potential solutions have been disclosed to address the neck-in and/or draw resonance tendencies of ethylene α-olefin interpolymers. Many of these solutions are equipment related and others primarily relate to modification of the properties of the ethylene α-olefin interpolymer by forming a polymer blend with a highly branched high pressure ethylene polymer such as, for example, low density polyethylene. Thompson in U.S. Pat. No. 4,348,346 (which is incorporated herein by reference) is an example of equipment related attempts to address neck-in and draw resonance. Thompson describes a secondary injection of polymer melt streams into the primary die at the edges of the primary web stream is described to reduce neck-in and provide improved edge bead control.

An equipment modification solution specific to retarding the onset of draw resonance is provided by Cancio et al. in U.S. Pat. No. 4,668,463 and U.S. Pat. No. 4,626,574 (the disclosures of both of which are incorporated herein by reference) where locating a draw roller not more than 6 inches (15.2 cm) from the die provides a short air/draw gap and reduced draw resonance. Luchessi et al. in U.S. Pat. No. 4,486,377, teaches the use of a fluid medium, e.g., nitrogen, carbon monoxide or air, directed against the molten web prior to the take-off position as a viable method of retarding draw resonance. Similarly, Kurtz et al. in U.S. Pat. No. 4,608,221 (the disclosure of which is incorporated herein by reference) discloses that draw resonance can be mitigated by the utilization of a tensioning device with a friction free surface in a "rapid cooling zone" between the die and the take-off position.

Conversely, as another equipment modification example for alleviating or reducing draw resonance, Chaing in U.S. Pat. No. 4,859,379 (the disclosure of which is incorporated herein by reference) discloses radiant heating of the molten web prior to a chill roll take-off position.

Examples of modified ethylene α-olefin interpolymer compositions exhibiting reduced draw resonance include U.S. Pat. No. 4,378,451 (Edwards), the disclosure of which is incorporated herein by reference, which discloses high flow rate compositions based on degraded propylene polymers blended with low density polyethylene. A similar example is provided by Werkman et al. in U.S. Pat. No. 3,247,290 (the disclosure of which is incorporated herein by reference) wherein thermally degraded (visbroken) high density polyethylene is blended with low density polyethylene to prepare high drawdown extrusion coating compositions. Another ethylene α-olefin interpolymer blend example involving low density polyethylene is disclosed by Kurtz et al. in U.S. Pat. No. 4,339,507 where high pressure LDPE at 20 to 98 weight percent in combination with a heterogeneous conventional LLDPE is taught to provide extrusion coating compositions with improved running rates.

An example of compositions that reduce draw resonance without the inclusion of a polymer degradation step and/or blending with a branched high pressure ethylene polymer is taught by Dohrer et al. in U.S. Pat. No. 4,780,264 where LLDPE with melt flow ratios less than 8.3 (i.e., utilizing molecular weight distributions even more narrow than typically employed) were found to allow surprisingly fast line speeds in extrusion coating and extrusion casting. However, predictably, these materials also exhibit higher neck-in and/or poor extrusion processability (e.g., higher extruder amperage).

In spite of the various advances, there is still a need for avoiding draw resonance and high neck-in problems when extruding ethylene α-olefin interpolymer compositions, particularly at high extrusion line speeds. For example, while the compositions disclosed in co-pending application Ser. No. 08/084,054, filed Jun. 29, 1993, exhibit significantly improved line speeds (draw-down rates), high resistance to draw resonance and reduced neck-in relative to conventional linear ethylene α-olefin compositions, such compositions still exhibit high neck-in (for example, $\geq 7$ inches at a 1.0 mil extrusion coating weight). Further, where ordinary high pressure ethylene polymers are used as blend component polymers in ethylene α-olefin polymer compositions to improved line speed, resistance to draw resonance and neck-in performance, relatively high concentrations (i.e., greater than 20 weight percent based on the total weight of the composition) of the high pressure ethylene polymer as a blend component polymer is required to effectuate such improvement. However, where a resin manufacturer or converter is capacity limited, such as, for example, where the only available equipment for addition purposes is a small scale weigh-feeder, a requirement of higher concentrations of a high pressure ethylene polymer blend component can be prohibitive.

As described hereinafter, the present invention substantially fills the need for ethylene polymer extrusion compositions having high line speeds, high resistance to draw resonance and substantially reduced neck-in and a method of making such compositions utilizing low capacity addition equipment. The compositions of the present invention can be used in conjunction with known equipment modifications and in combination with thermally degraded polymers to good advantage and the combined or synergistic benefits of the present invention and known solutions can also be realized.

In addition to the advantage of being able to make an improved extrusion composition by utilizing a wide variety of addition or blending equipment options, converters and fabricators can now realize the advantages of improved abuse or barrier properties (due to the utilization of ethylene α-olefin interpolymers), higher productivity rates (due to ability to obtain higher line speeds) and down-gauging (lower coat weights or thinner films and profiles), while still preparing high quality, uniform coatings, profiles and films. Another advantage of the invention is the significantly higher melt strength of the inventive composition relative to unmodified ethylene/α-olefin interpolymer. This increased melt strength should allow improved part definition, less sag and higher hot green strength in profile extrusions such as fabrication of wire and cable products.

SUMMARY OF THE INVENTION

In accordance with the present invention, we have discovered an improved method of making an ethylene polymer extrusion composition, an improved ethylene polymer extrusion composition, and a method for making an extrusion coated an substrate, an extrusion profile of the ethylene polymer composition and an extrusion cast film of the ethylene polymer composition.

One aspect of the invention is an ethylene polymer extrusion composition comprising from about 75 to 95 percent, by weight of the total composition, of at least one ethylene/α-olefin interpolymer composition selected from the group consisting of a substantially linear ethylene polymer composition, a homogeneously branched linear ethylene polymer composition and a heterogeneously branched linear ethylene polymer composition, wherein the ethylene/α-olefin polymer is characterized as having a density in the range of 0.85 g/cc to 0.940 g/cc and from about 5 to 25 percent, by weight of the total composition, of at least one high pressure ethylene polymer characterized as having a melt index, $I_2$, less than 6.0 g/10 minutes, a density of at least 0.916 g/cc, a melt strength of at least 9 cN as determined using a Gottfert Rheotens unit at 190° C., a $M_w/M_n$ ratio of at least 7.0 and a bimodal molecular weight distribution as determined by gel permeation chromatography, wherein the ethylene polymer extrusion composition has a melt index, 12, of at least 1.0 g/10 minutes.

Another aspect of the invention is a process for making an ethylene polymer extrusion composition comprising:

(a) combining 5 to 25 percent, by weight of the extrusion composition, of the at least one high pressure ethylene polymer composition with 75 to 95 percent, by weight of the extrusion composition, of the at least one ethylene α-olefin interpolymer composition, wherein the at least one high pressure ethylene polymer composition is combined using addition equipment that is part of the polymerization process used to prepare the at least one ethylene α-olefin interpolymer, to prepare an ethylene polymer extrusion composition having a melt index, $I_2$, of at least 1.0 g/10 minutes and a neck-in at a 1 mil monolayer extrusion coating weight of at least 12 percent lower than the expected neck-in value for the composition, and (b) collecting or conveying the extrusion composition in a form suitable for subsequent use.

Still another aspect of the invention is a process for using an ethylene polymer extrusion composition to make an extrusion coated substrate, an extrusion profile or an extrusion cast film comprising:

(i) feeding an ethylene polymer composition into at least one extruder of an extrusion line, wherein the ethylene polymer composition comprises from about 75 to 95 percent, by weight of the total composition, of at least one ethylene/α-olefin interpolymer composition selected from the group consisting of a substantially linear ethylene polymer composition, a homogeneously branched linear ethylene polymer composition and a heterogeneously branched linear ethylene polymer composition, wherein the ethylene/α-olefin polymer composition is characterized as having a density in the range of 0.85 g/cc to 0.940 g/cc and a melt index, $I_2$, in the range of 0.1 to 50 g/10 minutes, and from about 5 to 25 percent, by weight of the total composition, of at least high pressure ethylene polymer composition characterized as having a melt index, $I_2$, less than 1.0 g/10 minutes, a density of at least 0.916 g/cc, a melt strength of at least 9 cN as determined using a Gottfert Rheotens unit at 190° C., a $M_w/M_n$ ratio of at least 7.0 and a bimodal molecular weight distribution as determined by gel permeation chromatography, and wherein the ethylene polymer extrusion composition has a melt index, $I_2$, of at least 1.0 g/10 minutes, (ii) melting and mixing the ethylene polymer composition to form at least one uniform molten polymer stream, (iii) operating the extrusion line at line speeds greater than 152 meters/minute, (iii) extruding the molten polymer stream through a die to form a primary extrudate, and either (a) drawing down and cooling the extrudate to prepare the extruded profile of at least one layer of the ethylene polymer extrusion composition, or (b) drawing down the extrudate onto the substrate to thereby coat the substrate with at least one layer of the ethylene polymer extrusion composition, or (c) drawing down and cooling the extrudate onto a take-off device to make the film with at least one layer of the ethylene polymer extrusion composition, and (vi) conveying or collecting the profile, the coated substrate or the film for subsequent use.

A further aspect of the invention is an article comprising at least one layer of an ethylene polymer extrusion composition, wherein the extrusion composition comprises from about 75 to 95 percent, by weight of the total composition, of at least one ethylene/α-olefin interpolymer composition selected from the group consisting of a substantially linear ethylene polymer composition, a homogeneously branched linear ethylene polymer composition and a heterogeneously branched linear ethylene polymer composition, wherein the ethylene/α-olefin polymer is characterized as having a density in the range of 0.85 g/cc to 0.940 g/cc and from about 5 to 215 percent, by weight of the total composition, of at least one high pressure ethylene polymer characterized as having a melt index, $I_2$, less than 6.0 g/10 minutes, a density of at least 0.916 g/cc, a melt strength of at least 9 cN as determined using a Gottfert Rheotens unit at 190° C., a $M_w/M_n$ ratio of at least 7.0 and a bimodal molecular weight distribution as determined by gel permeation chromatography, and wherein the ethylene polymer extrusion composition has a melt index, $I_2$, of at least 1.0 g/10 minutes.

With the present invention, one obtains reduced neck-in, higher drawdown rates, and greater resistance to draw resonance than obtainable with known polymer blends or unmodified ethylene α-olefin interpolymer compositions.

DESCRIPTION OF THE DRAWINGS

FIG. 3 is a plot of melt strength versus neck-in at 1 mil for low density polyethylene resins which is used to predict, by extrapolation, the neck-in performance of resins that can not be drawn down due to excessive melt strength.

DESCRIPTION OF THE PREFERRED EMBODIMENTS

Figure 1:
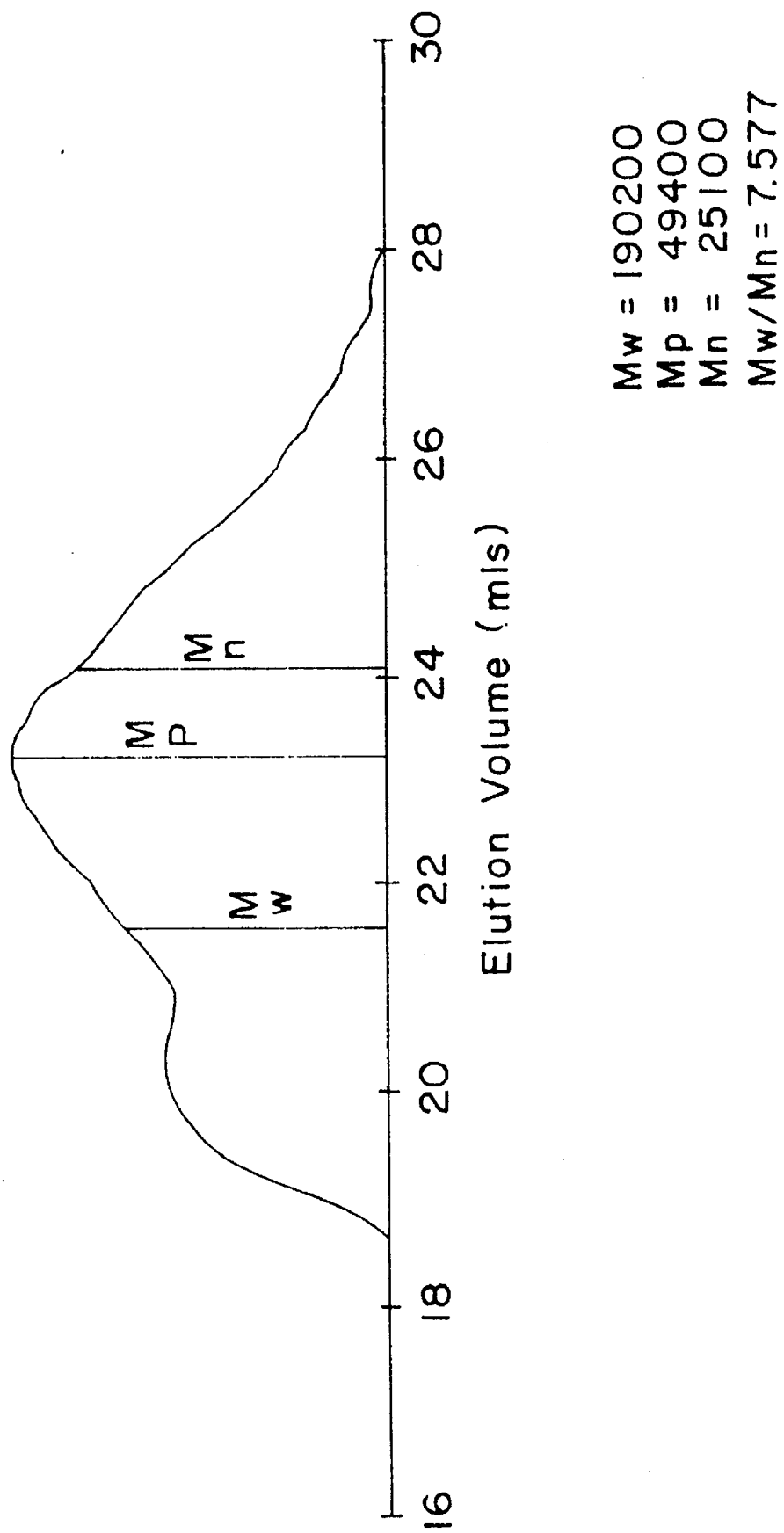
FIG. 1 is a graphical illustration of the molecular weight distribution as determined using gel permeation chromatography of a high pressure ethylene polymer composition suitable for use in the present invention.

The inventive composition comprises from 75 to 95 percent, preferably from 80 to 95 percent, more preferably from 85 to 95 percent, most preferably from 88 to 95 percent based on the total weight of the composition, of at least one ethylene α-olefin interpolymer composition and from 5 to 25 percent, preferably from 5 to 20 percent, more preferably from 5 to 115 percent, most preferably from 5 to 12 percent based on the total weight of the composition, of at least one high pressure ethylene polymer composition.

Preferably, the actual or measured neck-in value of the inventive ethylene polymer extrusion composition will be at least 12 percent, preferably at least 16 percent, more preferably at least 24 percent, most preferably at least 30 percent lower than the expected neck-in value for the composition based weight fractional contributions of the component polymer compositions. The density of the inventive composition will in the range of 0.850 to 0.940 g/cc, preferably in the range of 0.860 to 0.930 g/cc, more preferably in the range of 0.870 to 0.920 g/cc, most preferably in the range of 0.880 to 0.915 g/cc. The melt index, $I_2$, of the inventive composition with be in the range of 1 to 50 g/10 minutes, preferably in the range of 1 to 30 g/10 minutes, more preferably in the range of 1 to 20 g/10 minutes, most preferably in the range of 1.0 to 10 g/10 minutes. The melt strength of the inventive composition as determined using a Gottfert Rheotens will be at least 9 centiNewton (cN), preferably at least 15 cN, more preferably at least 20 cN, most preferably at least 25 cN.

Definition of Terms

The term "polymer", as used herein, refers to a polymeric compound prepared by polymerizing monomers, whether of the same or a different type. The generic term polymer thus embraces the term "homopolymer", usually employed to refer to polymers prepared from only one type of monomer.

The term "interpolymer", as used herein, refers to polymers prepared by the polymerization of at least two different types of monomers. The generic term "interpolymer" thus includes the term "copolymers", which is accurately employed to refer to polymers prepared from two different monomers. However, the term "copolymer" is also used in the art to refer to polymers prepared from two or more different monomers.

The term "expected neck-in value", as used herein, in contrast to an actual, measured neck-in value, refers to the neck-in value expected or predicted based on the weight fraction calculations and the individual neck-in values contributed by the component polymers of an extrusion composition. As an example of the calculation, where an extrusion composition comprises 90 weight percent of an ethylene α-olefin interpolymer which has an extrusion coating neck-in value at 1 mil of 7.5 and 10 weight percent of a high pressure ethylene polymer which has an extrusion coating neck-in value at 1 mil of 1.75 inches, the extrusion composition has an expected neck-in value of 6.9 inches where 6.75 inches would be contributed by the ethylene α-olefin polymer and 0.175 inch would be contributed by the high pressure ethylene polymer.

The term "high pressure ethylene polymer" or "highly branched ethylene polyethylene" is defined herein to mean that the polymer is partly or entirely homopolymerized or interpolymerized in autoclave or tubular reactors at pressures above 14,500 psi (100 MPa) with the use of free-radical initiators.

The terms "homogeneous ethylene polymer" and "homogeneously branched ethylene polymer" are used in the conventional sense in reference to an ethylene polymer in which the comonomer is randomly distributed within a given polymer molecule and wherein substantially all of the polymer molecules have the same ethylene to comonomer molar ratio. Homogeneously branched ethylene polymers are characterized by a short chain branching distribution index (SCBDI) greater than or equal to 30 percent, preferably greater than or equal to 50 percent, more preferably greater than or equal to 90 percent and essentially lack a measurable high density (crystalline) polymer fraction. The SCBDI is defined as the weight percent of the polymer molecules having a comonomer content within 50 percent of the median total molar comonomer content. For polyolefins, the SCBDI and presence of a high density polymer fraction can be determined by well-known temperature rising elution fractionation (TREF) techniques, such as those described by Wild et al., *Journal of Polymer Science, Poly. Phys. Ed.*, Vol. 20, p. 441 (1982), L. D. Cady, "The Role of Comonomer Type and Distribution in LLDPE Product Performance," SPE Regional Technical Conference, Quaker Square Hilton, Akron, Ohio, October 1–2, pp. 107–119 (1985), or U.S. Pat. No. 4,798,081, the disclosures of all which are incorporated herein by reference.

The term "substantially linear ethylene polymer" includes the term "substantially linear α-olefin polymer". Substantially linear α-olefin polymers contain long chain branches as well as short chain branches attributable to homogeneous comonomer incorporation. The long chain branches are of the same structure as the backbone of the polymer and are longer than the short chain branches. The polymer backbone of substantially linear α-olefin polymers is substituted with an average of 0.01 to 3 long chain branch/1000 carbons. Preferred substantially linear polymers for use in the invention are substituted with from 0.01 long chain branch/1000 carbons to 1 long chain branch/1000 carbons, and more preferably from 0.05 long chain branch/1000 carbons to 1 long chain branches/1000 carbons.

Long chain branching is defined herein as a chain length of at least 6 carbons, above which the length cannot be distinguished using $^{13}C$ nuclear magnetic resonance spectroscopy. The long chain branch can be as long as about the same length as the length of the polymer backbone to which it is attached.

The presence of long chain branching can be determined in ethylene homopolymers by using $^{13}C$ nuclear magnetic resonance (NMR) spectroscopy and is quantified using the method described by Randall (*Rev. Macromol. Chem. Phys.*, C29, V. 2&3, p. 285–297), the disclosure of which is incorporated herein by reference.

As a practical matter, current $^{13}C$ nuclear magnetic resonance spectroscopy cannot determine the length of a long chain branch in excess of six carbon atoms. However, there are other known techniques useful for determining the presence of long chain branches in ethylene polymers, including ethylene/1-octene interpolymers. Two such methods are gel permeation chromatography coupled with a low angle laser light scattering detector (GPC-LALLS) and gel permeation chromatography coupled with a differential viscometer detector (GPC-DV). The use of these techniques for long chain branch detection and the underlying theories have been well documented in the literature. See, e.g., Zimm, G. H. and Stockmayer, W. H., J. Chem. Phys., 17, 1301 (1949) and Rudin, A., *Modern Methods of Polymer Characterization,* John Wiley & Sons, New York (1991) pp. 103–112, both of which are incorporated by reference.

A. Willem deGroot and P. Steve Chum, both of The Dow Chemical Company, at the Oct. 4, 1994 conference of the Federation of Analytical Chemistry and Spectroscopy Society (FACSS) in St. Louis, Mo., presented data demonstrating that GPC-DV is a useful technique for quantifying the presence of long chain branches in substantially linear ethylene interpolymers. In particular, deGroot and Chum found that the level of long chain branches in substantially linear ethylene homopolymer samples measured using the Zimm-Stockmayer equation correlated well with the level of long chain branches measured using $^{13}$C NMR.

Further, deGroot and Chum found that the presence of octene does not change the hydrodynamic volume of the polyethylene samples in solution and, as such, one can account for the molecular weight increase attributable to octene short chain branches by knowing the mole percent octene in the sample. By deconvoluting the contribution to molecular weight increase attributable to 1-octene short chain branches, deGroot and Chum showed that GPC-DV may be used to quantify the level of long chain branches in substantially linear ethylene/octene copolymers.

deGroot and Chum also showed that a plot of Log($I_2$, Melt Index) as a function of Log(GPC Weight Average Molecular Weight) as determined by GPC-DV illustrates that the long chain branching aspects (but not the extent of long branching) of substantially linear ethylene polymers are comparable to that of high pressure, highly branched low density polyethylene (LDPE) and are clearly distinct from ethylene polymers produced using Ziegler-type catalysts such as titanium complexes and ordinary homogeneous catalysts such as hafnium and vanadium complexes.

For ethylene/α-olefin interpolymers, the long chain branch is longer than the short chain branch that results from the incorporation of the α-olefin(s) into the polymer backbone. The empirical effect of the presence of long chain branching in the substantial linear ethylene/α-olefin interpolymers used in the invention is manifested as enhanced rheological properties which are quantified and expressed herein in terms of gas extrusion rheometry (GER) results and/or melt flow, $I_{10}/I_2$, increases.

In contrast to the term "substantially linear ethylene polymer", the term "linear ethylene polymer" means that the polymer lacks measurable or demonstrable long chain branches.

Description of the High Pressure Ethylene Polymer

The molecular architecture of the high pressure ethylene polymer composition is critical with respect to the neck-in, melt strength and processability improvements of the final composition. The high pressure ethylene polymer for use in the invention has a relative high melt strength, i.e. at least 9 cN, preferably at least 15 cN, more preferably at least 20 cN, most preferably at least 25 cN. The high pressure ethylene polymer will be further characterized as having a bimodal distribution as determined by gel permeation chromatography and a $M_w/M_n$, will at least 7.0, preferably at least 7.3, more preferably at least 7.6. The melt index, $I_2$, of the high pressure ethylene polymer for use in preparing the extrusion composition of the invention is less than 6.0 g/10 minutes, preferably less than 1.0 g/10 minutes, more preferably less than 0.8 and most preferably less than 0.5 g/10 minutes. The density of the high pressure ethylene polymer for use in the invention is at least 0.916 g/cc, preferably at least 0.917, more preferably at least 0.918 g/cc. The density of the high pressure ethylene polymer composition will be higher when an interpolymer (e.g., copolymer or terpolymer) such as, for example ethylene-vinyl acetate-carbon monoxide (EVACO)) is used as the blend component polymer.

Preparation of the High Pressure Ethylene Polymer

The high pressure ethylene polymer composition selected for blending with the ethylene α-olefin interpolymer composition can be produced using conventional high pressure polymerization techniques in an autoclave or tubular reactor using at least one free radical initiator. When an autoclave reactor is employed, the reaction zone can be a single zone or multiple zone. Telogens such as, for example propylene and isobutane, can also be used as chain transfer agents. Preferably, the high pressure ethylene polymer is produced using an autoclave reactor without the addition of a telogen due to difficulty of manufacturing bimodal molecular weight distributions in a tubular process. However, the combination of an autoclave reactor in series or parallel with a tubular reactor is also suitable for making the inventive composition since bimodal molecular weight distributions can be manufactured using such techniques.

Suitable free-initiator for polymerizing ethylene at high reactor pressures are well known and include, but are not limited to, peroxides and oxygen. Techniques for maximizing the melt strength of ethylene polymers produced by high pressure polymerization are also known and include, but are not limited to, maximizing the reaction zone temperature differential, multiple initiator injections, extended reactor and post reactor residence times and higher gas inlet temperature.

Suitable High Pressure Ethylene Polymers

Suitable high pressure ethylene polymer compositions for use in preparing the inventive extrusion composition include low density polyethylene (homopolymer) and ethylene interpolymerized with at least one α,β-ethylenically unsaturated comonomers, e.g., acrylic acid, methacrylic acid, methyl acrylate and vinyl acetate. A suitable technique for preparing useful high pressure ethylene interpolymer compositions is described by McKinney et al. in U.S. Pat. No. 4,599,392, the disclosure of which is incorporated herein by reference.

While both high pressure ethylene homopolymers and interpolymers are believed to useful in the invention, homopolymer polyethylene is preferred. When at least one high pressure ethylene interpolymer composition is used, the preferred interpolymer composition will comprise from 0.1 to 55 weight percent comonomer, more preferably from 1 to 35 weight percent comonomer, and most preferably from 2 to 28 total weight percent comonomer, based on the total weight of the interpolymer composition.

Substantially Linear Ethylene α-Olefin Polymers

The substantially linear ethylene α-olefin polymers used in the present invention are a unique class of compounds that are further defined in U.S. Pat. No. 5,278,236 and in U.S. Pat. No. 5,278,272, each of which is incorporated herein by reference.

Substantially linear ethylene polymers differ significantly from the class of polymers conventionally known as homogeneously branched linear ethylene/α-olefin copolymers described, for example, by Elston in U.S. Pat. No. 3,645,992. Substantially linear ethylene polymers also differ significantly from the class of polymers known conventionally as heterogeneous Ziegler polymerized linear ethylene polymers (e.g., ultra low density polyethylene, linear low density polyethylene or high density polyethylene made, for example, using the technique disclosed by Anderson et al. in U.S. Pat. No. 4,076,698, incorporated herein by reference, and utilized by Dohrer et al. as described in U.S. Pat. No. 4,780,264), and from the class known as free-radical initiated highly branched high pressure low density ethylene homopolymer and ethylene interpolymers such as, for example, ethylene-acrylic acid (EAA) copolymers and ethylene-vinyl acetate (EVA) copolymers.

Preparation of Substantially Linear Ethylene Polymers

Single site polymerization catalyst, (e.g., the monocyclopentadienyl transition metal olefin polymerization catalysts described by Canich in U.S. Pat. No. 5,026,798 or by Canich in U.S. Pat. No. 5,055,438, the disclosures of which are both incorporated herein by reference) or constrained geometry catalysts (e.g., as described by Stevens et al. in U.S. Pat. No. 5,064,802, the disclosure of which incorporated herein by reference) can be used to prepare substantially linear ethylene polymers, so long as the catalysts are used consistent with the methods described in U.S. Pat. No. 5,278,236 and in U.S. Pat. No. 5,278,272. Such polymerization methods are also described in PCT/US 92/08812 (filed Oct. 15, 1992), the disclosure of which is incorporated herein by reference. However, the substantially linear ethylene interpolymers and homopolymers are preferably made by using suitable constrained geometry catalysts, especially constrained geometry catalysts as disclosed in U.S. application Ser. Nos.: 545,403, filed Jul. 3, 1990, now abandoned; 758,654, filed Sep. 12, 1991 U.S. Pat. No. 5,132,380; 758,660, filed Sep. 12, 1991, now abandoned; and 720,041, filed Jun. 24, 1991, now abandoned the teachings of all of which are incorporated herein by reference.

Suitable cocatalysts for use herein include but are not limited to, for example, polymeric or oligomeric aluminoxanes, especially methyl aluminoxane or modified methyl aluminoxane (made, e.g., as described in U.S. Pat. No. 5,041,584, U.S. Pat. No. 4,544,762, U.S. Pat. No. 5,015,749, and/or U.S. Pat. No. 5,041,585, the disclosures of each of which are incorporated herein by reference) as well as inert, compatible, non-coordinating, ion forming compounds. Preferred cocatalysts are inert, non-coordinating, boron compounds.

The polymerization conditions for manufacturing the substantially linear ethylene interpolymer compositions used in the present invention are preferably those useful in the continuous solution polymerization process, although the application of the present invention is not limited thereto. Continuous slurry and gas phase polymerization processes can also be used, provided the proper catalysts and polymerization conditions are employed. To polymerize the substantially linear interpolymers and copolymers useful in the invention, the single site and constrained geometry catalysts mentioned earlier can be used, but for substantially linear ethylene polymers the polymerization process should be operated such that the substantially linear ethylene polymers are formed. That is, not all polymerization conditions inherently make the substantially linear ethylene polymers, even when the same catalysts are used.

For example, in one embodiment of a polymerization process useful in making the novel substantially linear ethylene polymers, a continuous process is used, as opposed to a batch process.

Preferably, for substantially linear ethylene polymers, the polymerization is performed in a continuous solution polymerization process. Generally, manipulation of $I_{10}/I_2$ while holding $M_w/M_n$ relatively low for producing the substantially linear ethylene polymers using constrained geometry catalyst technology described herein is a function of reactor temperature and/or ethylene concentration. Reduced ethylene concentration and higher temperature generally produces higher $I_{10}/I_2$. Generally, as the ethylene concentration of the reactor decreases, the polymer concentration increases. For the novel substantially linear ethylene interpolymers and homopolymers, the polymer concentration for a continuous solution polymerization process is preferably above about 5 weight percent of the reactor contents, especially above about 6 weight percent of the reactor contents. Generally, the polymerization temperature of the continuous process, using constrained geometry catalyst technology, is from about 20° C. to about 250° C. If a narrow molecular weight distribution polymer ($M_w/M_n$ of from about 1.5 to about 2.5) having a higher $I_{10}/I_2$ ratio (e.g. $I_{10}/I_2$ of about 7 or more, preferably at least about 8, especially at least about 9) is desired, the ethylene concentration in the reactor is preferably not more than about 8 percent by weight of the reactor contents, especially not more than about 6 percent by weight of the reactor contents, and most especially not more than about 4 percent by weight of the reactor contents.

Description of Substantially Linear Ethylene Polymers

The substantially linear ethylene interpolymer compositions for use in the invention are characterized as having (a) a melt flow ratio, $I_{10}/I_2 \geq 5.63$, (b) a molecular weight distribution, $M_w/M_n$, as determined by gel permeation chromatography and defined by the equation:

$$(M_w/M_n) \leq (I_{10}/I_2) - 4.63,$$

(c) a gas extrusion rheology such that the critical shear rate at onset of surface melt fracture for the substantially linear ethylene polymer is at least 50 percent greater than the critical shear rate at the onset of surface melt fracture for a linear ethylene polymer, wherein the substantially linear ethylene polymer and the linear ethylene polymer comprise the same comonomer or comonomers, the linear ethylene polymer has an $I_2$, $M_w/M_n$ and density within ten percent of the substantially linear ethylene polymer and wherein the respective critical shear rates of the substantially linear ethylene polymer and the linear ethylene polymer are measured at the same melt temperature using a gas extrusion rheometer, and (d) a single differential scanning calorimetry, DSC, melting peak between −30° and 150° C.

The substantially linear ethylene interpolymers used in this invention essentially lack a measurable "high density" fraction as measured by the TREF technique. The substantially linear ethylene interpolymer generally do not contain a polymer fraction with a degree of branching less than or equal to 2 methyls/1000 carbons. The "high density polymer fraction" can also be described as a polymer fraction with a degree of branching less than about 2 methyls/1000 carbons. Among other benefits, the lack of a high density polymer fraction permits improved coating smoothness, printability, optical properties as well as enhanced film/coating flexibility and elasticity.

Determination of the critical shear rate and critical shear stress in regards to melt fracture as well as other rheology properties such as "rheological processing index" (PI), is performed using a gas extrusion rheometer (GER). The gas extrusion rheometer is described by M. Shida, R. N. Shroff and L. V. Cancio in *Polymer Engineering Science*, Vol. 17, No. 11, p. 770 (1977), and in "Rheometers for Molten Plastics" by John Dealy, published by Van Nostrand Reinhold Co. (1982) on pp. 97–99, both of which are incorporated by reference herein in their entirety. GER experiments are performed at a temperature of 190° C., at nitrogen pressures between 250 to 5500 psig using a 0.0754 mm diameter, 20:1 L/D die with an entrance angle of 180°. For the substantially linear ethylene polymers described herein, the PI is the apparent viscosity (in kpoise) of a material measured by GER at an apparent shear stress of $2.15 \times 10^6$ dyne/cm². The substantially linear ethylene polymer for use in the invention are ethylene interpolymers having a PI in the range of 0.01 kpoise to 50 kpoise, preferably 15 kpoise or less. The substantially linear ethylene polymers used herein have a PI less than or equal to 70 percent of the PI of a linear ethylene polymer (either a Ziegler polymerized polymer or a linear uniformly branched polymer as described by Elston in U.S. Pat. No. 3,645,992) having an $I_2$, $M_w/M_n$ and density, each within ten percent of the substantially linear ethylene polymers.

The rheological behavior of substantially linear ethylene polymers can also be characterized by the Dow Rheology Index (DRI), which expresses a polymer's "normalized relaxation time as the result of long chain branching." (See, S. Lai and G. W. Knight *ANTEC '93 Proceedings, INSITE™ Technology Polyolefins (ITP)—New Rules in the Structure/Rheology Relationship of Ethylene α-Olefin Copolymers*, New Orleans, La., May 1993, the disclosure of which is incorporated herein by reference). DRI values range from 0 for polymers which do not have any measurable long chain branching (e.g., Tafmer™ products available from Mitsui Petrochemical Industries and Exact™ products available from Exxon Chemical Company) to about 15 and is independent of melt index. In general, for low to medium pressure ethylene polymers (particularly at lower densities) DRI provides improved correlations to melt elasticity and high shear flowability relative to correlations of the same attempted with melt flow ratios. For the substantially linear ethylene polymers useful in this invention, DRI is preferably at least 0.1, and especially at least 0.5, and most especially at least 0.8. DRI can be calculated from the equation:

$$DRI = (3652879 * \tau_o^{1.00649}/\eta_o - 1)/10$$

where $\tau_o$ is the characteristic relaxation time of the material and $\eta_o$ is the zero shear viscosity of the material. Both $\tau_o$ and $\eta_o$ are the "best fit" values to the Cross equation, i.e., $$\eta/\eta_o = 1/(1 + (\dot{\gamma} * \tau_o)^{1-n})$$

where n is the power law index of the material, and $\eta$ and $\gamma$ are the measured viscosity and shear rate, respectively. Baseline determination of viscosity and shear rate data are obtained using a Rheometric Mechanical Spectrometer (RMS-800) under dynamic sweep mode from 0.1 to 100 radians/second at 160° C. and a Gas Extrusion Rheometer (GER) at extrusion pressures from 1,000 psi to 5,000 psi (6.89 to 34.5 MPa), which corresponds to shear stress from 0.086 to 0.43 MPa, using a 0.0754 mm diameter, 20:1 L/D die at 190° C. Specific material determinations can be performed from 140° to 190° C. as required to accommodate melt index variations.

An apparent shear stress versus apparent shear rate plot is used to identify the melt fracture phenomena and quantify the critical shear rate and critical shear stress of ethylene polymers. According to Ramamurthy in the *Journal of Rheology*, 30(2), 337–357, 1986, the disclosure of which is incorporated herein by reference, above a certain critical flow rate, the observed extrudate irregularities may be broadly classified into two main types: surface melt fracture and gross melt fracture.

Surface melt fracture occurs under apparently steady flow conditions and ranges in detail from loss of specular film gloss to the more severe form of "sharkskin." Herein, as determined using the above-described GER, the onset of surface melt fracture (OSMF) is characterized at the beginning of losing extrudate gloss at which the surface roughness of the extrudate can only be detected by 40x magnification. The critical shear rate at the onset of surface melt fracture for the substantially linear ethylene interpolymers and homopolymers is at least 50 percent greater than the critical shear rate at the onset of surface melt fracture of a linear ethylene polymer having essentially the same $I_2$ and $M_w/M_n$.

Gross melt fracture occurs at unsteady extrusion flow conditions and ranges in detail from regular (alternating rough and smooth, helical, etc.) to random distortions. For commercial acceptability and maximum abuse properties of films, coatings and profiles, surface defects should be minimal, if not absent. The critical shear stress at the onset of gross melt fracture for the substantially linear ethylene polymer compositions used in the invention, especially those having a density >0.910 g/cc, is greater than $4 \times 10^6$ dynes/cm². The critical shear rate at the onset of surface melt fracture (OSMF) and the onset of gross melt fracture (OGMF) will be used herein based on the changes of surface roughness and configurations of the extrudates extruded by a GER. Preferably, in the present invention, the substantially linear ethylene polymer composition will be characterized by its critical shear rate, rather than its critical shear stress.

Melting Peak Determination

Substantially linear α-olefin polymers, like other homogeneously branched ethylene α-olefin polymer compositions consisting a single polymer component material, are characterized by a single DSC melting peak. The single melting peak is determined using a differential scanning calorimeter standardized with indium and deionized water. The method involves 5–7 mg sample sizes, a "first heat" to about 140° C. which is held for 4 minutes, a cool down at 10°/min. to −30° C. which is held for 3 minutes, and heat up at 10° C./min. to 140° C. for the "second heat". The single melting peak is taken from the "second heat" heat flow vs. temperature curve. Total heat of fusion of the polymer is calculated from the area under the curve.

For substantially linear ethylene polymer compositions having a density of 0.875 g/cc to 0.910 g/cc, the single melting peak may show, depending on equipment sensitivity, a "shoulder" or a "hump" on the low melting side that constitutes less than 12 percent, typically, less than 9 percent, and more typically less than 6 percent of the total heat of fusion of the polymer. Such an artifact is observable for other homogeneously branched polymers such as Exact™ resins and is discerned on the basis of the slope of the single melting peak varying monotonically through the melting region of the artifact. Such an artifact occurs within 34° C., typically within 27° C., and more typically within 20° C. of the melting point of the single melting peak. The heat of fusion attributable to an artifact can be separately determined by specific integration of its associated area under the heat flow vs. temperature curve.

Molecular Weight Distribution Determination

The molecular weight distribution of the ethylene α-olefin interpolymer compositions and the high pressure ethylene polymer compositions are determined by gel permeation chromatography (GPC) on a Waters 150 high temperature chromatographic unit equipped with differential refractometer and three columns of mixed porosity. The columns are supplied by Polymer Laboratories and are commonly packed with pore sizes of $10^3$, $10^4$, $10^5$ and $10^6$ Å. The solvent is 1,2,4-trichlorobenzene, from which 0.3 percent by weight solutions of the samples are prepared for injection. The flow rate is 1.0 milliliters/minute, unit operating temperature is 140° C. and the injection size is 100 microliters.

The molecular weight determination with respect to the polymer backbone is deduced by using narrow molecular weight distribution polystyrene standards (from Polymer Laboratories) in conjunction with their elution volumes. The equivalent polyethylene molecular weights are determined by using appropriate Mark-Houwink coefficients for polyethylene and polystyrene (as described by Williams and Ward in *Journal of Polymer Science*, Polymer Letters, Vol. 6, p. 621, 1968) to derive the following equation:

$$M_{polyethylene} = a * (M_{polystyrene})^b.$$

In this equation, a=0.4316 and b=1.0. Weight average molecular weight, $M_w$, is calculated in the usual manner according to the following formula: $M_w = \Sigma w_i \times M_i$, where $w_i$ and $M_i$ are the weight fraction and molecular weight, respectively, of the $i^{th}$ fraction eluting from the GPC column.

Comparative Description of Ethylene α-Olefin Polymer

Substantially linear ethylene polymers are known to have excellent processability, despite having a relatively narrow molecular weight distribution (i.e., the $M_w/M_n$ ratio is typically less than 3.5, preferably less than 2.5, and more preferably less than 2). Surprisingly, in light of disclosures by Dohrer and Niemann (U.S. Pat. No. 4,780,264 and *ANTEC Proceedings* 1989, "Resistance to Draw Resonance of Linear Low Density Polyethylene Through Improved Resin Design", page 28–30) and unlike homogeneously and heterogeneously branched linear ethylene polymers, the melt flow ratio ($I_{10}/I_2$) of substantially linear ethylene polymers can be varied essentially independently of the molecular weight distribution, $M_w/M_n$. Accordingly, the preferred ethylene α-olefin interpolymer for use in preparing the inventive extrusion composition is a substantially linear ethylene polymer.

Substantially linear ethylene polymers are homogeneously branched ethylene polymers and are disclosed in U.S. Pat. No. 5,272,236 and U.S. Pat. No. 5,272,272, the disclosures of which are incorporated herein by reference. Homogeneously branched substantially linear ethylene polymers are available from The Dow Chemical Company as Affinity™ polyolefin plastomers, and as Engage™ polyolefin elastomers. Homogeneously branched substantially linear ethylene polymers can be prepared by the continuous solution, slurry, or gas phase polymerization of ethylene and one or more optional α-olefin comonomers in the presence of a constrained geometry catalyst, such as is disclosed in European Patent Application 416,815-A, incorporated herein by reference. Preferably, a solution polymerization process is used to manufacture the substantially linear ethylene interpolymer used in the present invention.

Homogeneously Branched Linear Ethylene Polymers

Although their molecular architecture differs significantly from that of the substantially linear ethylene polymer compositions, homogeneously branched linear ethylene polymer compositions are also useful in this invention.

Single site polymerization catalysts, (e.g., the monocyclopentadienyl transition metal olefin polymerization catalysts described by Canich in U.S. Pat. No. 5,026,798 or by Canich in U.S. Pat. No. 5,055,438, the disclosures of which are both incorporated herein by reference) can be used to prepare homogeneously branched linear ethylene polymer compositions. As exemplified in U.S. Pat. No. 3,645,992 to Elston, homogeneously branched linear ethylene polymer compositions can also be prepared in conventional polymerization processes using Ziegler-type catalysts such as, for example, zirconium and vanadium catalyst systems. Another example is provided in U.S. Pat. No. 5,218,071 to Tsutsui et al. which discloses the use of catalyst systems based on hafnium for the preparation of homogeneously branched linear ethylene polymer blends.

Homogeneously branched linear ethylene polymers are typically characterized as having a molecular weight distribution, $M_w/M_n$, of about 2. Commercial examples of homogeneously branched linear ethylene polymer compositions suitable in the invention include those sold by Mitsui Petrochemical Industries as Tafmer™ resins and by Exxon Chemical Company as Exact™ resins.

Heterogeneously Branched Linear Ethylene Polymers

The terms "heterogeneous ethylene polymer" and "heterogeneously branched ethylene polymer" mean that the ethylene polymer is characterized as a mixture of interpolymer molecules having various ethylene to comonomer molar ratios. Heterogeneously branched ethylene polymers are characterized as having a short chain branching distribution index (SCBDI) less than about 30 percent. All known heterogeneously branched ethylene polymers are linear and have no measurable or demonstrable long chain branching. Heterogeneously branched linear ethylene polymers are available from The Dow Chemical Company as Dowlex™ linear low density polyethylene and as Attane™ ultra-low density polyethylene resins. Heterogeneously branched linear ethylene polymers can be prepared by the continuous, batch or semi-batch solution, slurry or gas phase polymerization of ethylene and one or more optional α-olefin comonomers in the presence of a Ziegler Natta catalyst, such as by the process disclosed in U.S. Pat. No. 4,076,698 to Anderson et al., incorporated herein by reference. Preferably, heterogeneously branched ethylene polymers are typically characterized as having molecular weight distributions, $M_w/M_n$, in the range of front 3.5 to 4.1.

Suitable α-Olefin Comonomers

The homogeneously branched and heterogeneously branched ethylene α-olefin interpolymer compositions useful in invention are interpolymers of ethylene and at least one α-olefin. Suitable α-olefins are represented by the following formula:

$$CH_2=CHR$$

where R is a hydrocarbyl radical having from one to twenty carbon atoms. The interpolymerization process can be a solution, slurry or gas phase technique or combinations thereof. Suitable α-olefins for use as comonomers include 1-propylene, 1-butene, 1-isobutylene, 1-pentene, 1-hexene, 4-methyl-1-pentene, 1-heptene and 1-octene, as well as other monomer types such as styrene, halo- or alkyl-substituted styrenes, tetrafluoro-ethylene, vinyl benzocyclobutane, 1,4-hexadiene, 1,7-octadiene, and cycloalkenes, e.g., cyclopentene, cyclohexene and cyclooctene. Preferably, the α-olefin will be 1-butene, 1-pentene, 4-methyl-1-pentene, 1-hexene, 1-heptene, 1-octene, or mixtures thereof. More preferably, the α-olefin will be 1-hexene, 1-heptene, 1-octene, or mixtures thereof, as coatings, profiles and films fabricated with the resultant extrusion composition will have especially improved abuse properties where such higher α-olefins are utilized as comonomers. However, most preferably, the α-olefin will be 1-octene and the polymerization process will be a continuous solution process.

Ethylene α-Olefin Polymer Density and Molecular Weight

The density of the ethylene α-olefin interpolymers, as measured in accordance with ASTM D-792, for use in the present invention is generally in the range of 0.850 grams/cubic centimeter (g/cc) to 0.940 g/cc, preferably from 0.86 g/cc to 0.930 g/cc, more preferably from 0.870 g/cc to 0.920 g/cc, and most preferably, from 0.88 g/cc to 0.915 g/cc.

The molecular weight of ethylene polymers is conveniently indicated using a melt index measurement according to ASTM D-1238, Condition 190C/2.16 kilogram (kg), formerly known as "Condition E" and also known as $I_2$. Melt index is inversely proportional to the molecular weight of the polymer. Thus, the higher the molecular weight, the lower the melt index, although the relationship is not linear. The melt index for the ethylene α-olefin interpolymers useful herein is generally from 1 gram/10 minutes (g/10 min.) to 50 g/10 min., preferably from 1 g/10 min. to 30 g/10 min., more preferably from 1 g/10 min. to 20 g/10 min., more preferably from 1.0 g/10 min. to 10 g/10 minutes.

Other measurements useful in characterizing the molecular weight of ethylene α-olefin interpolymers compositions involve melt index determinations with higher weights, such as, for common example, ASTM D-1238, Condition 190C/10 kg (formerly known as "Condition N" and also known as $I_{10}$). "Melt flow ratio" is defined herein as the ratio of a higher weight melt index determination to a lower weight determination, and for measured $I_{10}$ and the $I_2$ melt index values, the melt flow ratio is conveniently designated as $I_{10}/I_2$. The $I_{10}/I_2$ ratio of the ethylene α-olefin interpolymer component is preferably at least about 5.63, and especially from about 5.63 to about 18, and most especially from about 6 to about 15.

Preparation of the Ethylene Polymer Extrusion Composition

The ethylene polymer extrusion compositions of this invention can be prepared by any suitable means known in the art including tumble dry-blending, weigh feeding, solvent blending, melt blending via compound or side-arm extrusion, or the like as well as combinations thereof. Multiple reactor polymerization processes can also be used in making the at least one ethylene α-olefin interpolymers useful in preparing the ethylene polymer composition of the present invention. Examples of suitable multiple reactor ethylene α-olefin interpolymerization techniques are those disclosed in copending applications Ser. No. 07/815,716 filed Dec. 30, 1991, now abandoned and Ser. No. 08/010,958 filed Jan. 29, 1993, now abandoned and in U.S. Pat. No. 3,914,342, the disclosures of all of which are incorporated herein by reference. The multiple reactors can be operated in series or in parallel or a combination thereof, with at least one homogeneous single-site type or heterogeneous Ziegler-type catalyst employed in at least one of the reactors or in both reactors.

When a multiple reactor technique is used to make the ethylene α-olefin interpolymer component of the invention, the high pressure ethylene polymer component can be added by side-arm extrusion or weigh feed equipment situated downstream of the multiple reactors but directly connected to the primary manufacturing stream, or by subsequent incorporation in a different manufacturing unit or even at converter facilities.

The inventive extrusion composition can also be blended with other polymer materials and can be used to prepare monolayer or multilayer articles and structures, for eaxmple, as a selant, adhesive or tie layer. The other polymer materials can be blended with the inventive composition to modify processing, film strength, heat seal, or adhesion characteristics.

Both the high pressure ethylene polymer composition and the ethylene α-olefin interpolymer composition can be used in a chemically and/or physically modified form to prepare the inventive composition. Such modifications can be accomplished by any known technique such as, for example, by ionomerization and extrusion grafting.

Additives such as antioxidants (e.g., hindered phenolics such as Irganox® 1010 or Irganox® 1076 supplied by Ciba Geigy), phosphites (e.g., Irgafos® 168 also supplied by Ciba Geigy), cling additives (e.g., PIB), Standostab PEPQ™ (supplied by Sandoz), pigments, colorants, fillers, and the like can also be included in the ethylene polymer extrusion composition of the present invention, to the extent that they do not interfere with the high drawdown and substantially reduced neck-in discovered by Applicants. The article made from or using the inventive composition may also contain additives to enhance antiblocking and coefficient of friction characteristics including, but not limited to, untreated and treated silicon dioxide, talc, calcium carbonate, and clay, as well as primary, secondary and substituted fatty acid amides, chill roll release agents, silicone coatings, etc. Other additives may also be added to enhance the anti-fogging characteristics of, for example, transparent cast films, as described, for example, by Niemann in U.S. Pat. No. 4,486,552, the disclosure of which is incorporated herein by reference. Still other additives, such as quaternary ammonium compounds alone or in combination with ethylene-acrylic acid (EAA) copolymers or other functional polymers, may also be added to enhance the antistatic characteristics of coatings, profiles and films of this invention and allow, for example, the packaging or making of electronically sensitive goods.

Multilayered constructions comprising the inventive composition can be prepared by any means known including coextrusion, laminations and the like and combinations thereof. Moreover, compositions of this invention can be employed in coextrusion operations where a higher drawdown material is used to essentially "carry" one or more lower drawdown materials.

The ethylene polymer extrusion compositions of this invention, whether of monolayer or multilayered construction, can be used to make extrusion coatings, extrusion profiles and extrusion cast films. When the inventive composition is used for coating purposes or in multilayered constructions, substrates or adjacent material layers can be polar or nonpolar including for example, but not limited to, paper products, metals, ceramics, glass and various polymers, particularly other polyolefins, and combinations thereof. For extrusion profiling, various articles can be fabricated including, but not limited to, refrigerator gaskets, wire and cable jacketing, wire coating, medical tubing and water piping. Extrusion cast film made from or with the inventive composition can be used in food packaging and industrial stretch wrap applications.

EXAMPLES

The following examples illustrate some of the particular embodiments of the present invention, but the following should not be construed to mean the invention is limited to the particular embodiments shown. Also, practitioners of these arts will appreciate that the maximum line speeds attainable with one type of extruder or coater will not necessarily be the same as the speeds attainable with another and, as such, the same equipment arrangement should be used to provide meaningful comparisons and to appreciate the advantages discovered by the Applicants.

Melt strength determinations are made at 190° C. using a Goettfert Rheotens and an Instron capillary rheometer. The capillary rheometer is aligned and situated above the Rheoten unit and delivers, at a constant plunger speed of 25.4 mm/min, a filament of molten polymer to the Rheotens unit. The Instron is equipped with a standard capillary die of 2.1 mm diameter and 42 mm length (20:1 L/D) and delivers the filament to the toothed take-up wheels of the Rheotens unit rotating at 10 mm/s. The distance between the exit of the Instron capillary die and the nip point on the Rheotens take-up wheels was 100 mm. The experiment to determine melt strength begins by accelerating the take-up wheels on the Rheotens unit at 2.4 mm/s$^2$, the Rheotens unit is capable of acceleration rates from 0.12 to 120 mm/s$^2$. As the velocity of the Rheoten take-up wheels increase with time, the draw down force was recorded in centiNewtons (cN) using the Linear Variable Displacement Transducer (LVDT) on the Rheotens unit. The computerized data acquisition system of the Rheotens unit records the draw down force as a function of take-up wheel velocity. The actual melt strength value is taken from the plateau of the recorded draw down force. The velocity at filament break is also recorded in mm/s as the melt strength break speed.

Inventive Examples 1–3 and Comparative Examples 4–15

Table 1 summarizes the polymer compositons used in an extrusion coating and melt strength evaluation. Sample A and B are substantially linear ethylene/1-octene interpolymers manufactured according to the teachings provided by Lai et al. in U.S. Pat. Nos. 5,278,236 and 5,278,272. Sample C is a homogeneously branched linear ethylene/1-hexene interpolymer supplied by Exxon Chemical Company under the commercial designation of Exact™ 3022. Samples D-I are all high pressure ethylene polymers manufactured by The Dow Chemical Company. Sample E is manufactured using conventional tubular reactor techniques. Samples D and F-I are manufactured using conventional autoclave reactor techniques. As an example of the polymerization requirements to prepare a suitable high pressure ethylene polymer for use in the present invention, Table 2 summarizes the polymerization conditions used manufacturing Sample D. The reactor employed is a 15 inch, 10:1 L/D constant-stirred, continuous autoclave reactor. Samples D-I all contain 200–300 ppm Irganox™ 1010 antioxidant and Sample C contains (according to infra-red analysis following solvent extraction of pressed film of the sample) 230 ppm of active Irganox™ 1076 antioxidant, both antioxidants are supplied by Ciba-Geigy Chemical Company.

TABLE 1

| Sample | Polymer Type | Melt Index, $I_2$ (g/10 min.) | Density (g/cc) | Melt Strength, (cN) | Melt Strength, Break Speed (mm/s) | GPC Mw/Mn Ratio | GPC Bimodality |
|---|---|---|---|---|---|---|---|
| A | SLEP | 4.75 | 0.910 | 1.30 | 269 | 2.11 | No |
| B | SLEP | 6.0 | 0.900 | 1.27 | 160 | 2.18 | No |
| C | HLEP | 10 | 0.905 | 0.349 | 303 | 2.32 | No |
| D | LDPE | 0.42 | 0.918 | 25.4 | 103 | 7.6 | Yes |
| E | LDPE | 0.26 | 0.921 | 17.7 | 124 | <6 | No |
| F | LDPE | 10.9 | 0.919 | 4.70 | 273 | 6.02 | No |
| G | LDPE | 5.49 | 0.916 | 9.7 | 233 | 7.42 | Yes |
| H | LDPE | 3.17 | 0.924 | 8.88 | 186 | 5.78 | Yes |
| I | LDPE | 7.74 | 0.917 | 7.56 | 247 | 6.97 | No |

SLEP = substantially linear ethylene polymer prepared by the interpolymerization of ethylene and 1-octene.prepared in a continuous solution polymerization process using a constrained geometry catalyst system.
HLEP = a homogeneous linear ethylene polymer, Exact ™ 3022 supplied by Exxon Chemical Company
LDPE = high pressure low density polyethylene

TABLE 2

Autoclave Reactor Conditions

| | |
|---|---|
| Reactor Pressure, psi | 21,300 |
| Zone 1 Temperature, °C. | 235 |
| Zone 2 Temperature, °C. | 235 |
| Zone 3 Temperature, °C. | 254 |
| Zone 4 Temperature, °C. | 282 |
| Top (Zone 1) Gas Inlet Temperature, °C. | 70 |
| Bottom (Zones 2) Gas Inlet Temperature, °C. | 28 |
| Recycle Rate, lbs/hr | 1,500 |
| High Pressure Separator Pressure, psi | 1,650 |
| Low Pressure Separator Pressure, psi | 4 |
| Zone 1 Initiator Type | 50/50 TPO/TPA Mix |
| Zone 1 Initiator Concentration, wt % in Isopar ™ C | 20 |
| Zone 1 Initiator Feed Rate, lbs/hr | 17.5 |
| Zone 2 Initiator Type | 50/50 TPO/TPA Mix |
| Zone 2 Initiator Concentration, wt % in Isopar ™ C | 20 |
| Zone 2 Initiator Feed Rate | 14.8 |
| Zone 3 Initiator Type | 100% TPA |
| Zone 3 Initiator Concentration, wt % in Isopar ™ C | 20 |
| Zone 3 Initiator Feed Rate | 6.8 |
| Zone 4 Initiator Type | 50/50 TPA/DTBP Mix |
| Zone 4 Initiator Concentration, wt % in Isopar ™ C | 20 |
| Zone 4 Initiator Feed Rate | 16.8 |
| High Pressure Level | Gassed Out |
| Low Pressure Separator Level, % by volume | 40 |
| Production Rate, lbs./hr | 7,406 |
| Secondary Processing | None |

Figure 2:
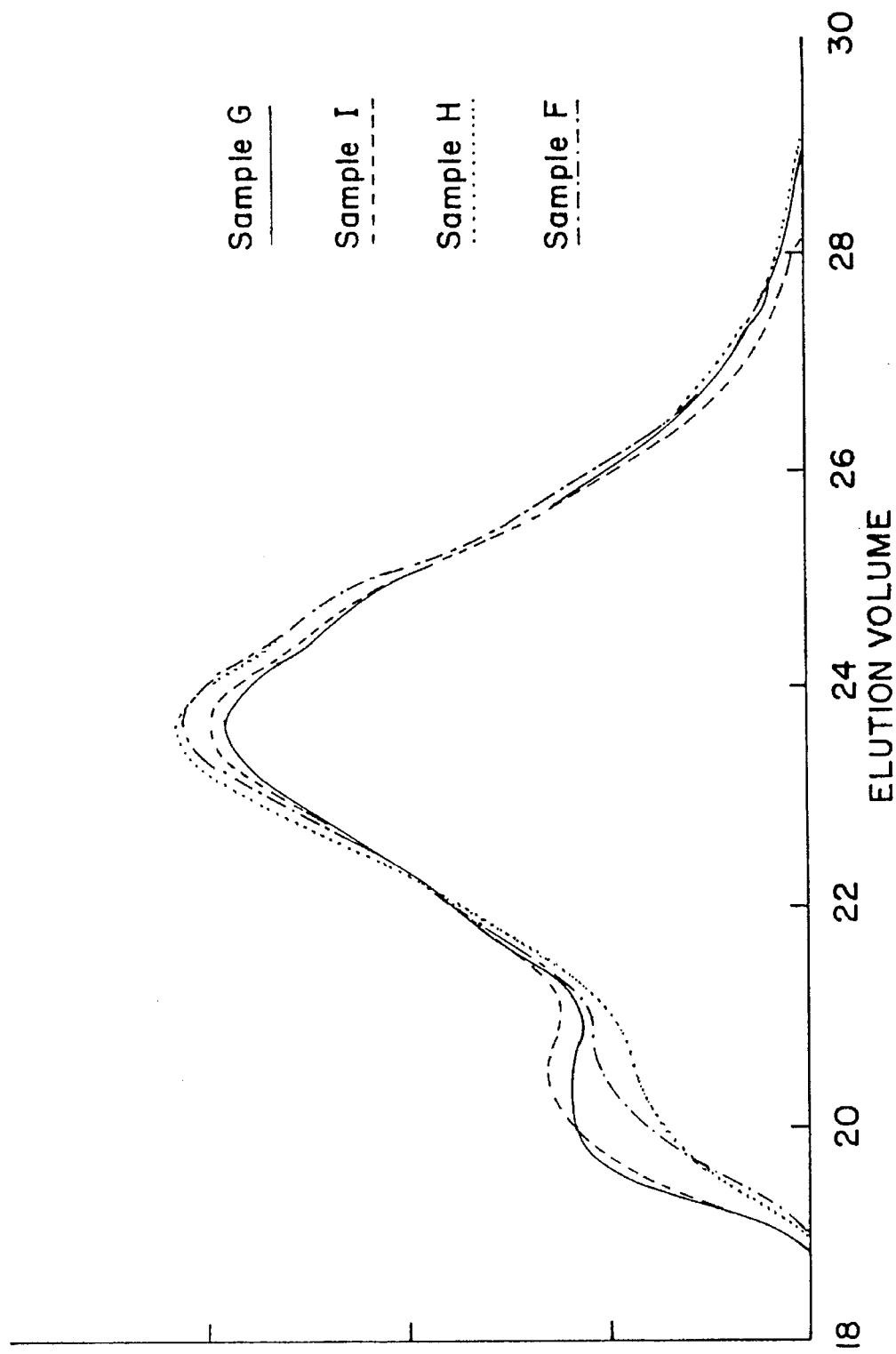
FIG. 2 is a graphical illustration of the molecular weight distribution and the comparative bimodality (as determined using gel permeation chromatography) of four different high pressure ethylene polymer compositions.

TPO = tert-butyl peroctoate; TPA = tert-butyl peracetate; DTBP = di-tert-butyl peroxide
Isopar ™ C is an isoparafinic hydrocarbon solvent with a boiling range of 95–108° C. supplied by Exxon Chemical Company FIG. 1 illustrates the molecular weight distribution (MWD) of Sample D as determined by gel permeation chromatography (GPC) is bimodal (i.e., the polymer composition is characterized as having a distinct high molecular hump). FIG. 2 shows that Samples G and I have bimodal molecular weight distribution, whereas Samples F and H do not exhibit distinct bimodality. Table I indicates that Samples D and G have relatively high melt strength, broad molecular weight distributions, and bimodality, and as such these materials are considered suitable blend component compositions for imparting improved extrusion properties.

Table 3 summarizes the blend compositions that are prepared from the individual polymer compositions listed in Table 1. The blend compositions were prepared either by melt mixing in a Haake torque mixer or by weigh feeding the components directly into the primary extruder of the extrusion coating line in accordance with the weight percentages shown in Table 3.

TABLE 3

| | Sample | | | | | |
|---|---|---|---|---|---|---|
| Weight Percent | Example 1 | Example 2 | Example 3 | *Comp. Example 4 | *Comp. Example 5 | Example 6 |
| B | 95 | 90 | 80 | 100 | 90 | 90 |
| D | 5 | 10 | 20 | | | |
| E | | | | | 10 | |
| G | | | | | | 10 |

| | Sample | | | | | |
|---|---|---|---|---|---|---|
| Weight Percent | *Comp. Example 7 | Example 8 | *Comp. Example 9 | *Comp. Example 10 | *Comp. Example 11 | *Comp. Example 12 |
| B | 90 | 80 | | | | |
| C | | | | | | 100 |
| D | | | 100 | | | |
| E | | | | 100 | | |
| F | | | | | 100 | |
| G | | 20 | | | | |
| I | 10 | | | | | |

| | Sample | | | |
|---|---|---|---|---|
| Weight Percent | Example 13 | *Comp. Example 14 | *Comp. Example 15 | *Comp. Example 16 |
| A | | | | 100 |
| C | 90 | | | |
| D | 10 | | | |
| H | | 100 | | |
| I | | | 100 | |

*Not an example of the present invention; provided for comparative purposes only.

Examples 1–3, 6, 8 and 13 and Comparative Examples 4, 5, 7, 11–12, and 14–16 are evaluated for high drawn down performance on an extrusion coating line. The coating equipment consists of a three-extruder Black Clawson coextrusion coating line with a 3½ inch (8.9 cm) diameter primary extruder with a 30:1 L/D, a 2½ inch (6.4 cm) diameter secondary extruder with a 24:1 L/D and a 2 inch diameter secondary extruder. A 76 cm slot coextrusion feedblock die is attached to the primary extruder and deckled to 69 cm with a 20 mil die gap and a 6 inch (15.2 cm) air/draw gap. The line is controlled by a microprocessor system that include weight cell feed hoppers for rate checks and coating weight control. The extrusion line is also equipped with a matte finish, glycol cooled chill roll set at 57° F. The targeted extrusion temperature and screw speed for all extrusion coating examples is 625° F. and 90 rpm, respectively, unless otherwise noted. However, Example 13 and Comparative Examples 14 and 18 were extrusion coated at a extrusion melt temperature of about 612° F. Molten extrudate or webs for all examples are drawn down continuously onto 50 lb. Kraft paper.

The evaluation involves systematically increasing the line/take-off speed while maintaining a constant screw speed (90 rpm) until draw resonance is observed or web breakage occurs. The line speed at which the onset of draw resonance (i.e., web began to oscillate) is initially observed or at which web breakage occurs, is taken as the ultimate or maximum drawdown rate. The drawdown rate, neck-in measured at a 440 fpm (134 mpm) line speed for a 1 mil coating thickness, extruder amperage, die pressure, expected neck-in performance and the percent neck-in lower than expected for the examples are summarized in Table 4. The component neck-in contribution for Samples D and E are taken by extrapolation from FIG. 3 since these materials could not be extrusion coated as single component polymer compositions. The expected neck-in performance is taken from a linear blend rule equation as exemplified above.

As can be observed from the data in Table 4, extrusion coating compositions comprising high pressure ethylene polymers characterized as having high melt strength and a broad, bimodal molecular distribution allow substantially reduced neck-in performance relative to unmodified ethylene α-olefin interpolymer compositions. However, surprisingly, the neck-in performance of such compositions is also significantly lower than expected based on respective component materials.

In another evaluation, the heat seal, hot tack, adhesion and tear properties of Example I is determined and compared to several commercially available sealant extrusion coating resins. Two different multilayered structures are used for the heal seal and hot tack determination. The structures are as follows:

Structure A:
48 gauge Hostaphan™ 2DEF/0.5 mil Primacor™ 4608/Example

Structure B:
30 lbs. Bleached Machine-Grade Kraft Paper/0.75 mil Primacor 3460/0.0035 gauge A-Type Wettable Aluminum Foil/Example Hostaphan 2DEF is a polyester film supplied by Hoechst Diafoil and Primacor resins 4608 and 3460 are ethylene acrylic acid (EAA) interpolymers supplied by The Dow Chemical Company.

For adhesion determinations, 0.035 gauge A-Type wettable Aluminum foil and 50 gauge oriented polypropylene are separately slip-sheeted at the coater die while the Example is being coated at 400 fpm. Adhesion is taken as resistance to delamination or separation and is rated qualitatively from excellent to poor where an "excellent" rate denote the Example is highly resistance to separation when pulled manually.

Tear properties are determined in accordance with ASTM D1922 and is reported in grams. Tear strength is measured both in the machine direction (MD) and in the cross direc-

TABLE 4

Extrusion Coating Results on Draw Resonance and Neck-In

| Example | Die Pressure (psi) | Extruder Amps | Drawdown Rate† ft/min. | Neck-In at 134 mpm/1 Mil (in) | Expected Neck-In (in) | Percent Lower than Expected |
|---|---|---|---|---|---|---|
| 1 | 1,560 | 147 | >1,800 | 6.25 | 7.14 | 12.5 |
| 2 | 1,610 | 149 | >1,700 | 4.375 | 6.78 | 35.5 |
| 3 | 1,690 | 148 | 1,260 | 3.25 | 6.06 | 46.3 |
| 4* | 1,740 | 145 | 590 | 7.5 | NA | NA |
| 5* | 1,610 | 149 | 1,300 | 6.125 | 6.83 | 10.3 |
| 6 | 1,500 | 145 | >1,600 | 5.75 | 6.89 | 16.5 |
| 7* | 1,700 | 137 | 1,600 | 6.125 | 6.93 | 11.6 |
| 8 | 1,490 | 138 | >1,600 | 4.375 | 6.28 | 30.3 |
| 9* | ND | ND | ND | ND | 0.25** | NA |
| 10* | ND | ND | ND | ND | 0.45** | NA |
| 11* | ND | ND | 1,460 | 1.8 | NA | NA |
| 12* | 1,090 | 164 | 670 | 9.25 | NA | NA |
| 13 | 1,160 | 167 | >1,600 | 4.125 | 8.35 | 50.6 |
| 14* | ND | ND | 980 | 2.0 | NA | NA |
| 15* | 1,150 | 97 | 1,150 | 1.75 | NA | NA |
| 16* | 1,000 | 135 | 670 | 6.75 | NA | NA |

†Drawdown rate = take-off speed at which dimensional irregularities are observed to initially occur or the take-off instantaneous to web breakage.
*Not an example of the present invention; provided for comparative purposes.
**Neck-in value extrapolated from FIG. 3 based on melt strength determination.
ND = not determined.
NA = not applicable.

tion (CD) for the Example coated at 440 fpm onto 50-lb. Kraft paper. The term "tear strength" is used herein to represent the average between MD and CD Elmendorf tear values and, likewise, is reported in grams.

Heat seal initiation temperature is defined as the minimum temperature for a 2 lb/in (0.4 kg/cm) seal strength. Heat seal testing is done on a Topwave Hot Tack Tester using a 0.5 second dwell time with a 40 psi (0.28 MPa) seal bar pressure. The seals are made at 5° increments in the range of 60°–160° C. by folding the sealant layer over and sealing it to itself. The so-formed seals are pulled 24 hours after they are made using an Instron tensiometer at a 10 in/min. (51 cm/min.) crosshead rate. The heat seal strength is taken as the highest strength in pounds per inch for the Example in the temperature range of 60°–160° before the sealing bar burns-through the sealant layer.

Hot tack initiation temperature is defined as the minimum seal temperature required to develop a 4 Newton/in (1.6 N/cm) seal strength. Hot tack testing is performed using a Topwave Hot Tack Tester set at a 0.5 second dwell, 0.2 second delay time, and 40 psi (0.28 MPa) seal bar pressure. Hot tack seals are made at 5° increments in the temperature range of 60°–160° C. by folding the sealant layer over and hot tack sealing it to itself. The peel rate applied to the so-formed hot tack seals is of 150 mm/sec. The tester pulls the seal immediately after the 0.2 second delay. Hot tack strength is taken as the maximum N/in value in the 60°–160° C. temperature range for the Example. The hot tack window is taken as the temperature range where the hot tack strength is >4 Newtons for Structure A and >8 Newtons for Structure B. Table 5 illustrates the comparative performance properties of Example 1.

TABLE 5

| Example | 1 | 15 | 17 | 18 | 19 |
|---|---|---|---|---|---|
| Extrusion Temperature, °F. | 610 | 618 | 614 | 550 | 550 |
| Heat Seal Initiation, °C. | | | | | |
| Structure A | 82 | 95 | 105 | 83 | 85 |
| Structure B | 97 | 105 | 117 | ND | ND |
| Heat Seal Strength, lbs/in | | | | | |
| Structure A | 14.0 | 10.0 | 10.0 | 9.5 | 10.0 |
| Structure B | 7.8 | 7.0 | 7.0 | | 7.5 |
| Hot Tack Initiation, °C. | | | | | |
| Structure A | 95 | CND | CND | 87 | 90 |
| Structure B | 98 | 112 | 117 | 94 | 95 |
| Hot Tack Strength, N/in | | | | | |
| Structure A | 8.5 | 2.5 | 3 | 10 | 10 |
| Structure B | 16 | 9 | 8 | | 14.5 |
| Hot Tack Window, °C. | | | | | |
| Structure B >8 Newtons | 70 | 15 | 5 | 75 | 75 |
| Structure A >4 Newtons | 25 | 0 | 0 | 65 | 65 |
| Adhesion Rating | | | | | |
| Aluminum Foil | G | F | G | E | E |
| Oriented Polypropylene | E | P | P | P | P |
| Elmendorf Tear Strength, g | 327 | 121 | 240 | ND | ND |

E = excellent; G = good; F = fair; P = poor; ND = not determined; CND = could not determine since hot tack strength did not exceed 4 Newtons at any temperature.
*Not an example of the invention; provided for comparative purposes. Comparative Examples 17 and 18 is Dowlex 3010 and Primacor 3440, both of which are supplied by The Dow Chemical Company. Comparative Example 19 is Surlyn ionomer 1652 which is supplied by Dupont Chemical Company.

Table 5 shows Inventive Example 1 has excellent sealant properties, making it useful as a sealant layer in both monolayer or multilayer constructions.

We claim:

1. An ethylene polymer extrusion composition comprising from about 80 to 95 percent, by weight of the total composition, of at least one ethylene/α-olefin interpolymer composition selected from the group consisting of a homogeneously branched linear ethylene polymer composition and a heterogeneously branched linear ethylene polymer composition, wherein the ethylene/α-olefin polymer is characterized as having a density in the range of 0.85 g/cc to 0.940 g/cc and from about 5 to 20 percent, by weight of the total composition, of at least one high pressure ethylene polymer characterized as having a melt index, $I_2$, less than 6.0 g/10 minutes, a density of at least 0.916 g/cc, a melt strength of at least 9 cN as determined using a Gottfert Rheotens unit at 190° C., a $M_w/M_n$ ratio of at least 7.0 and a bimodal molecular weight distribution as determined by gel permeation chromatography, wherein the ethylene polymer extrusion composition has a melt index, $I_2$, of at least 1.0 g/10 minutes.

2. The composition of claim 1, wherein the α-olefin is at least one $C_3$–$C_{20}$ α-olefin.

3. The composition of claim 2, wherein the α-olefin is selected from the group consisting of 1-propylene, 1-butene, 1-isobutylene, 1-hexene, 4-methyl-1-pentene, 1-pentene, 1-heptene and 1-octene.

4. The composition of claim 1, wherein the ethylene α-olefin interpolymer composition is in the range of 85 to 95 percent, based on the total weight of the composition, the high pressure ethylene polymer composition is in the range of 5 to 15 percent, based on the total weight of the composition, and the high pressure ethylene polymer composition is characterized as having a melt index, $I_2$, less than 1.0 g/10 minutes, a density of at least 0.916 g/cc, a melt strength of at least 15 cN as determined using a Gottffert Rheotens unit at 190° C., a $M_w/M_n$ ratio of at least 7.3 and a bimodal molecular weight distribution as determined by gel permeation chromatography.

5. The composition of claim 4, wherein the ethylene α-olefin interpolymer composition is a copolymer of ethylene and 1-octene and the high pressure ethylene polymer composition is an ethylene homopolymer.

6. The composition of claim 1, wherein the at least one ethylene α-olefin interpolymer composition is a homogeneously branched linear ethylene polymer.

7. The composition of claim 1, wherein the at least one ethylene α-olefin interpolymer composition is a heterogeneously branched linear ethylene polymer.

8. The composition of claim 1, wherein the at least one high pressure ethylene polymer composition is an ethylene homopolymer.

9. The composition of claim 1, wherein the at least one high pressure ethylene polymer composition is an interpolymer of ethylene and at least one unsaturated comonomer.

10. A process for using an ethylene polymer extrusion composition to make an extrusion coated substrate, an extrusion profile or an extrusion cast film comprising:

(i) feeding an ethylene polymer composition into at least one extruder of an extrusion line, wherein the ethylene polymer composition comprises from about 80 to 95 percent, by weight of the total composition, of at least one ethylene/α-olefin interpolymer composition selected from the group consisting of a homogeneously branched linear ethylene polymer composition and a heterogeneously branched linear ethylene polymer composition, wherein the ethylene/α-olefin polymer composition is characterized as having a density in the range of 0.85 g/cc to 0.940 g/cc and a melt index, $I_2$, in the range of 0.1 to 50 g/10 minutes, and from about 5 to 20 percent, by weight of the total composition, of at least high pressure ethylene polymer composition characterized as having a melt index, $I_2$, less than 1.0 g/10 minutes, a density of at least 0.916 g/cc, a melt strength of at least 9 cN as determined using a Gottfert Rheotens unit at 190° C., a $M_w/M_n$ ratio of at least 7.0 and a bimodal molecular weight distribution as determined by gel permeation chromatography, and wherein the ethylene polymer extrusion composition has a melt index, $I_2$, of at least 1.0 g/10 minutes, (ii) melting and mixing the ethylene polymer composition to form at least one uniform molten polymer stream, (iii) operating the extrusion line at line speeds greater than 152 meters/minute, (iii) extruding the molten polymer stream through a die to form a primary extrudate, and either (a) drawing down and cooling the extrudate to prepare the extruded profile of at least one layer of the ethylene polymer extrusion composition, or (b) drawing down the extrudate onto the substrate to thereby coat the substrate with at least one layer of the ethylene polymer extrusion composition, or (c) drawing down and cooling the extrudate onto a take-off device to make the film with at least one layer of the ethylene polymer extrusion composition, and (vi) conveying or collecting the profile, the coated substrate or the film for subsequent use.

11. The process of claim 10, wherein the at least one layer of step (iii)(a), (iii)(b) or (iii)(c) is a sealant layer, adhesive layer or abuse resistance layer.

12. The process of claim 10, wherein the at least one layer of step (iii)(b) is an sealant layer.

13. An article comprising at least one layer of an ethylene polymer extrusion composition, wherein the extrusion composition comprises from about 80 to 95 percent, by weight of the total composition, of at least one ethylene/α-olefin interpolymer composition selected from the group consisting of a homogeneously branched linear ethylene polymer composition and a heterogeneously branched linear ethylene polymer composition, wherein the ethylene/α-olefin polymer is characterized as having a density in the range of 0.85 g/cc to 0.940 g/cc and from about 5 to 20 percent, by weight of the total composition, of at least one high pressure ethylene polymer characterized as having a melt index, $I_2$, less than 6.0 g/10 minutes, a density of at least 0.916 g/cc, a melt strength of at least 9 cN as determined using a Gottfert Rheotens unit at 190° C., a $M_w/M_n$ ratio of at least 7.0 and a bimodal molecular weight distribution as determined by gel permeation chromatography, and wherein the ethylene polymer extrusion composition has a melt index, $I_2$, of at least 1.0 g/10 minutes.

14. The article of claim 13, wherein the ethylene polymer composition is in the form of an extrusion profile, an extrusion coating into a substrate or an extrusion cast film.

15. The article of claim 13, wherein the at least one layer of an ethylene polymer composition is an sealant layer, adhesive layer or abuse resistance layer.

16. The process of claim 10 wherein the ethylene α-olefin interpolymer composition is an interpolymer of ethylene and at least 1-octene and the high pressure ethylene polymer composition is an ethylene homopolymer.

17. The process of claim 10, wherein the at least one ethylene α-olefin interpolymer composition is a homogeneously branched linear ethylene polymer.

18. The process of claim 10, wherein the at least one ethylene α-olefin interpolymer composition is a heterogeneously branched Linear ethylene polymer.

19. The process of any one of claims 17 and 18, wherein the ethylene α-olefin interpolymer composition is in the range of 85 to 95 percent, based on the total weight of the composition, the high pressure ethylene polymer composition is in the range of 5 to 15 percent, based on the total weight of the composition, and the high pressure ethylene polymer composition is characterized as having a melt index, $I_2$, less than 1.0 g/10 minutes, a density of at least 0.916 g/cc, a melt strength of at least 15 cN as determined using a Gotffert Rheotens unit at 190° C., a $M_w/M_n$ ratio of at least 7.3 and a bimodal molecular weight distribution as determined by gel permeation chromatography.

20. The process of claim 10, wherein the at least one high pressure ethylene polymer composition is an ethylene homopolymer.

21. The process of claim 10, wherein the at least one high pressure ethylene polymer composition is an interpolymer of ethylene and at least one unsaturated comonomer.

22. The article of claim 13 wherein the ethylene α-olefin interpolymer composition is an interpolymer of ethylene and at least 1-octene and the high pressure ethylene polymer composition is an ethylene homopolymer.

23. The article of claim 13, wherein the at least one ethylene α-olefin interpolymer composition is a homogeneously branched linear ethylene polymer.

24. The article of claim 13, wherein the at least one ethylene α-olefin interpolymer composition is a heterogeneously branched linear ethylene polymer.

25. The article of any one of claims 23 and 24, wherein the ethylene α-olefin interpolymer composition is in the range of 85 to 95 percent, based on the total weight of the composition, the high pressure ethylene polymer composition is in the range of 5 to 15 percent, based on the total weight of the composition, and the high pressure ethylene polymer composition is characterized as having a melt index, $I_2$, less than 1.0 g/10 minutes, a density of at least 0.916 g/cc, a melt strength of at least 15 cN as determined using a Gottleft Rheotens unit at 190° C., a $M_w/M_n$ ratio of at least 7.3 and a bimodal molecular weight distribution as determined by gel permeation chromatography.

26. The article of claim 13, wherein the at least one high pressure ethylene polymer composition is an ethylene homopolymer.

27. The article of claim 13, wherein the at least one high pressure ethylene polymer composition is an interpolymer of ethylene and at least one unsaturated comonomer.

28. The composition of claim 1, wherein the least one ethylene/α-olefin interpolymer composition comprises at least one homogeneously branched linear ethylene polymer composition and at least one heterogeneously branched linear ethylene polymer composition.

29. The process of claim 10, wherein the least one ethylene/α-olefin interpolymer composition comprises at least one homogeneously branched linear ethylene polymer composition and at least one heterogeneously branched linear ethylene polymer composition.

30. The article of claim 13, wherein the least one ethylene/α-olefin interpolymer composition comprises at least one homogeneously branched linear ethylene polymer composition and at least one heterogeneously branched linear ethylene polymer composition.

31. The composition of claim 3, wherein the α-olefin is 1-butene.

32. The composition of claim 3, wherein the α-olefin is 1-hexene.

33. The composition of claim 3, wherein the α-olefin is 1-octene.

34. The composition of claim 4, wherein the ethylene α-olefin interpolymer composition is a copolymer of ethylene and 1-butene and the high pressure ethylene polymer composition is an ethylene homopolymer.

35. The composition of claim 4, wherein the ethylene α-olefin interpolymer composition is a copolymer of ethylene and 1-hexene and the high pressure ethylene polymer composition is an ethylene homopolymer.

36. The process of claim 10, wherein the α-olefin is at least one $C_3$–$C_{20}$ α-olefin.

37. The process of claim 36, wherein the α-olefin is selected from the group consisting of 1-propylene, 1-butene, 1-isobutylene, 1-hexene, 4-methyl-1-pentene, 1-pentene, 1-heptene and 1-octene.

38. The process of claim 37, wherein the α-olefin is 1-butene.

39. The process of claim 37, wherein the α-olefin is 1-hexene.

40. The process of claim 37, wherein the α-olefin is 1-octene.

41. The process of claim 19, wherein the ethylene α-olefin interpolymer composition is a copolymer of ethylene and 1-butene and the high pressure ethylene polymer composition is an ethylene homopolymer.

42. The process of claim 19, wherein the ethylene α-olefin interpolymer composition is a copolymer of ethylene and 1-hexene and the high pressure ethylene polymer composition is an ethylene homopolymer.

43. The process of claim 19, wherein the ethylene α-olefin interpolymer composition is a copolymer of ethylene and 1-octene and the high pressure ethylene polymer composition is an ethylene homopolymer.

44. The article of claim 13, wherein the α-olefin is at least one $C_3$–$C_{20}$ α-olefin.

45. The article of claim 44, wherein the α-olefin is selected from the group consisting of 1-propylene, 1-butene, 1-isobutylene, 1-hexene, 4-methyl-1-pentene, 1-pentene, 1-heptene and 1-octene.

46. The article of claim 45, wherein the α-olefin is 1-butene.

47. The article of claim 45, wherein the α-olefin is 1-hexene.

48. The article of claim 45, wherein the α-olefin is 1-octene.

49. The article of claim 25, wherein the ethylene α-olefin interpolymer composition is a copolymer of ethylene and 1-butene and the high pressure ethylene polymer composition is an ethylene homopolymer.

50. The article of claim 25, wherein the ethylene α-olefin interpolymer composition is a copolymer of ethylene and 1-hexene and the high pressure ethylene polymer composition is an ethylene homopolymer.

51. The article of claim 25, wherein the ethylene α-olefin interpolymer composition is a copolymer of ethylene and 1-octene and the high pressure ethylene polymer composition is an ethylene homopolymer.

* * * * *